(12) United States Patent  (10) Patent No.: US 8,938,055 B2
Mairs et al.  (45) Date of Patent: *Jan. 20, 2015

(54) SYSTEM AND METHOD FOR ESTABLISHING DATA COMMUNICATION USING PRE-CONFIGURED USER DATA

(71) Applicant: Metaswitch Networks Ltd, Enfield (GB)

(72) Inventors: Chris Mairs, Enfield (GB); David Drysdale, London (GB); Shaun Crampton, Enfield (GB); Philip Pearl, Enfield (GB); Felix Palmer, Enfield (GB)

(73) Assignee: Metaswitch Networks Ltd, Enfield (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/918,054

(22) Filed: Jun. 14, 2013

(65) Prior Publication Data

US 2013/0279675 A1  Oct. 24, 2013

Related U.S. Application Data

(63) Continuation of application No. PCT/GB2011/052477, filed on Dec. 14, 2011.

(60) Provisional application No. 61/423,055, filed on Dec. 14, 2010.

(30) Foreign Application Priority Data

Mar. 18, 2011 (GB) ................... 1104613.3

(51) Int. Cl.
 *H04M 3/42* (2006.01)
 *H04M 7/00* (2006.01)

(52) U.S. Cl.
 CPC .............. *H04M 3/42* (2013.01); *H04M 7/0036* (2013.01); *H04M 3/42076* (2013.01); *H04M 3/42119* (2013.01); *H04M 7/0054* (2013.01)
 USPC ..................................... 379/201.01; 370/259

(58) Field of Classification Search
 USPC ............... 379/88.17, 202.01, 203.01, 204.01, 379/205.01, 207.01, 265.09, 900, 201.01; 370/260, 261, 262, 352, 259; 455/416
 See application file for complete search history.

(56) References Cited

U.S. PATENT DOCUMENTS 5,802,282 A * 9/1998 Hales et al. ................... 709/204
6,112,084 A   8/2000 Sicher et al.

(Continued)

FOREIGN PATENT DOCUMENTS

EP   0999712 A1   5/2000
EP   1069789 A1   1/2001

(Continued)

OTHER PUBLICATIONS

Search Report issued in corresponding application No. GB1104613.3 on Jul. 27, 2011.

(Continued)

*Primary Examiner* — Antim Shah
(74) *Attorney, Agent, or Firm* — EIP US LLP

(57) ABSTRACT

Call party details of a telephone call involving first and second telephony user devices are received. The call party details include first and second identities associated with the first and second telephony user devices respectively. A client-server connection request is received from, and a client-server connection is established with, one of the user devices. A session for the communication of data to and/or from the user devices is established separately from the telephone call on the basis of the first and second identities. The receipt of pre-configured user data by the one of the user devices is enabled via the client-server connection. The pre-configured user data has been specified by a user of another of the user devices prior to the establishment of the telephone call as data for receipt by other user devices during telephone calls conducted by the user.

19 Claims, 20 Drawing Sheets

(56) References Cited

U.S. PATENT DOCUMENTS

| | | |
|---|---|---|
| 6,295,551 B1 | 9/2001 | Roberts et al. |
| 6,317,609 B1 | 11/2001 | Alperovich et al. |
| 6,516,203 B1 | 2/2003 | Enzmann et al. |
| 6,704,294 B1 * | 3/2004 | Cruickshank ............... 370/265 |
| 6,888,936 B1 | 5/2005 | Groen et al. |
| 7,496,978 B1 | 3/2009 | Begeja et al. |
| 7,996,552 B2 | 8/2011 | Philyaw et al. |
| 2002/0057678 A1 | 5/2002 | Jiang et al. |
| 2002/0181446 A1 | 12/2002 | Preston et al. |
| 2003/0078053 A1 | 4/2003 | Abtin et al. |
| 2004/0114747 A1 | 6/2004 | Trandal et al. |
| 2004/0152457 A1 | 8/2004 | Goldstein et al. |
| 2004/0190695 A1 | 9/2004 | Parker |
| 2004/0213207 A1 | 10/2004 | Silver et al. |
| 2005/0165719 A1 | 7/2005 | Greenspan et al. |
| 2005/0249146 A1 | 11/2005 | Pinault et al. |
| 2007/0010264 A1 * | 1/2007 | Sun et al. ..................... 455/466 |
| 2007/0242809 A1 | 10/2007 | Mousseau et al. |
| 2007/0244811 A1 | 10/2007 | Tumminaro |
| 2008/0043965 A1 * | 2/2008 | Cellini et al. ............ 379/205.01 |
| 2008/0081627 A1 | 4/2008 | Shan et al. |
| 2008/0117897 A1 | 5/2008 | Criddle et al. |
| 2008/0146256 A1 | 6/2008 | Hawkins et al. |
| 2008/0317000 A1 | 12/2008 | Jackson |
| 2009/0164645 A1 | 6/2009 | Sylvain |
| 2009/0215425 A1 | 8/2009 | Ebersberger |
| 2010/0056119 A1 | 3/2010 | Shaffer et al. |
| 2010/0235894 A1 * | 9/2010 | Allen et al. ....................... 726/7 |
| 2011/0225238 A1 | 9/2011 | Shaffer et al. |
| 2013/0230157 A1 * | 9/2013 | Mairs et al. ................ 379/93.01 |
| 2013/0230158 A1 * | 9/2013 | Mairs et al. ................ 379/93.01 |
| 2013/0252595 A1 * | 9/2013 | Mairs et al. .................. 455/415 |
| 2014/0013371 A1 | 1/2014 | Brown et al. |

FOREIGN PATENT DOCUMENTS

| | | |
|---|---|---|
| EP | 1441555 A1 | 7/2004 |
| EP | 2081369 A1 | 7/2009 |
| GB | 2362291 B | 1/2004 |
| WO | 98/59256 A2 | 12/1998 |
| WO | 99/49677 A1 | 9/1999 |
| WO | 02/15519 A2 | 2/2002 |
| WO | 03/034692 A2 | 4/2003 |
| WO | 2004/059995 A1 | 7/2004 |
| WO | 2005/064958 A1 | 7/2005 |
| WO | 2006/010373 A1 | 2/2006 |
| WO | 2007/004933 A1 | 1/2007 |
| WO | 2007/062077 A1 | 5/2007 |
| WO | 2007/092908 A2 | 8/2007 |
| WO | 2008/065662 A2 | 6/2008 |
| WO | 2009/009167 | 1/2009 |
| WO | 2009/061332 A1 | 5/2009 |
| WO | 2011/069559 | 6/2011 |

OTHER PUBLICATIONS

Search Report issued in corresponding application No. PCT/GB2011/052477 on May 21, 2012.

International Search Report and Written Opinion issued in corresponding application No. PCT/GB2011/001491 on Jan. 23, 2012.

International Search Report and Written Opinion issued in corresponding application No. PCT/GB2011/001492 on Jan. 23, 2012.

International Search Report and Written Opinion issued in corresponding application No. PCT/GB2011/001493 on Jan. 25, 2012.

International Search Report and Written Opinion issued in corresponding application No. PCT/GB2011/001490 on Feb. 17, 2012.

* cited by examiner

SYSTEM AND METHOD FOR ESTABLISHING DATA COMMUNICATION USING PRE-CONFIGURED USER DATA

CROSS REFERENCE TO PRIOR APPLICATIONS

This application is a continuation of International Application No. PCT/GB2011/052477, filed Dec. 14, 2011 and designating the U.S., which claims priority to Great Britain Patent Application No. 1104613.3, filed Mar. 18, 2011 and claims priority to U.S. provisional patent application No. 61/423,055, filed on Dec. 14, 2010, both of which are incorporated herein by reference in their entirety.

TECHNICAL FIELD

The present invention relates to the communication of data. In particular, but not exclusively, the present invention relates to the communication of data between user devices during telephone calls.

BACKGROUND

Communication between parties in a telecommunications network can be carried out in a number of ways. Most commonly, communication is carried out by a calling party dialling the telephone dialling number of a called party telephony device on a calling party telephony device. The dialling of the telephone number causes a call set-up process to be carried out in the network which results in the telephone of the called party ringing. If the called party chooses to answer their telephone, a telephone call can ensue between the calling party and the called party. The telephone call allows audio data such as speech data to be transferred along an audio channel created between the calling party telephony device and the called party telephony device.

Some telephony devices have enhanced capabilities which allow transfer of video data along a video channel created between the calling party telephone and the called party telephone. A video call may not be possible unless both the calling and called party telephone devices support video call functionality.

Audio or video conferencing may be carried out between three or more remote telephony devices, allowing communication of audio and/or video data between parties to the conference.

Web conferencing is also possible between multiple remote parties using devices with combined data processing, display and telephony capabilities. Web conferencing allows online meetings to be conducted for viewing and/or collaborating on common multimedia content.

Parties may also exchange text data by use of text messaging services such as the Short Message Service (SMS). Enhanced messaging services such as the Multimedia Messaging Service (MMS) allow parties to exchange image and video data in addition to text data.

The exemplary methods of communication described above provide a wide range of options for remote parties to communicate with each other. However, each method typically has different requirements in terms of device and/or network capability and interchanging between the different methods is either not possible or requires use of inconvenient set-up or configuration processes.

It would therefore be desirable to provide improved methods for communicating data between remote parties, including communication of data in a manner convenient to the parties.

SUMMARY

According to a first aspect of the invention, there is provided a method of establishing a communications session for communication of data with respect to at least two user devices in a data communications network, the method comprising:

receiving call party details of a telephone call, the telephone call involving at least a first telephony user device and a second telephony user device, said call party details including a first identity associated with said first telephony user device and a second identity associated with said second telephony user device;

receiving a client-server connection request from, and establishing a client-server connection with, at least one of said at least two user devices;

establishing, on the basis of said first and second identities received in said call party details, a separate communications session, separate from said telephone call, for the communication of data to and/or from said at least two user devices; and enabling the receipt of pre-configured user data by said at least one of said at least two user devices via said client-server connection, said pre-configured user data having been specified by a user of one other of said at least two user devices prior to the establishment of said telephone call as data for receipt by other user devices during telephone calls conducted by said user.

In accordance with a second aspect of the invention, there is provided server apparatus arranged to establish a communications session for communication of data with respect to at least two user devices in a data communications network, the server apparatus being arranged to:

receive call party details of a telephone call, the telephone call involving at least a first telephony user device and a second telephony user device, said call party details including a first identity associated with said first telephony user device and a second identity associated with said second telephony user device;

receive a client-server connection request from, and establish a client-server connection with, at least one of said at least two user devices;

establish, on the basis of said first and second identities received in said call party details, a separate communications session, separate from said telephone call, for the communication of data to and/or from said at least two user devices; and enable the receipt of pre-configured user data by said at least one of said at least two user devices via said client-server connection, said pre-configured user data having been specified by a user of one other of said at least two user devices prior to the establishment of said telephone call as data for receipt by other user devices during telephone calls conducted by said user.

In accordance with a third aspect of the invention, there is provided a telephony user device for establishing a communications session for communication of data with respect to at least one other user device in a data communications network, the telephony user device comprising a processor configured to:

transmit call party details of a telephone call, the telephone call involving at least said telephony user device, said telephony user device being a first telephony user device, and a second telephony user device, said call party details including a first identity associated with said first telephony user device and a second identity associated with said second telephony user device;

transmit a client-server connection request to, and establishing a client-server connection with, a server;

establish, on the basis of said first and second identities received in said call party details, a separate communications session, separate from said telephone call, for the communication of data to and/or from said at least one other user device; and transmit pre-configured user data to said at least one other user device via said client-server connection, said pre-configured user data having been specified by a user of said telephony user device prior to the establishment of said telephone call as data for transmittal to other user devices during telephone calls conducted by said user.

In accordance with a fourth aspect of the invention, there is provided a telephony user device capable of establishing a communications session for communication of data with respect to at least one other user device in a data communications network, the telephony user device comprising a data store and a processor configured to:

transmit call party details of a telephone call, the telephone call involving at least said telephony user device, said telephony user device being a first telephony user device, and a second telephony user device, said call party details including a first identity associated with said first telephony user device and a second identity associated with said second telephony user device, at least one of said first and second identities comprising a telephone dialling number;

transmit a client-server connection request to, and establish a client-server connection with, a server;

establish, on the basis of said first and second identities received in said call party details, a separate communications session, separate from said telephone call, for the communication of data to and/or from said at least one other user device;

receive data from said at least one other user device via said client-server connection; and present the user of said telephony user device with an option to update said data store with at least a part of said received data.

Further features and advantages of the invention will become apparent from the following description of preferred embodiments of the invention, given by way of example only, which is made with reference to the accompanying drawings.

DETAILED DESCRIPTION

Figure 1:
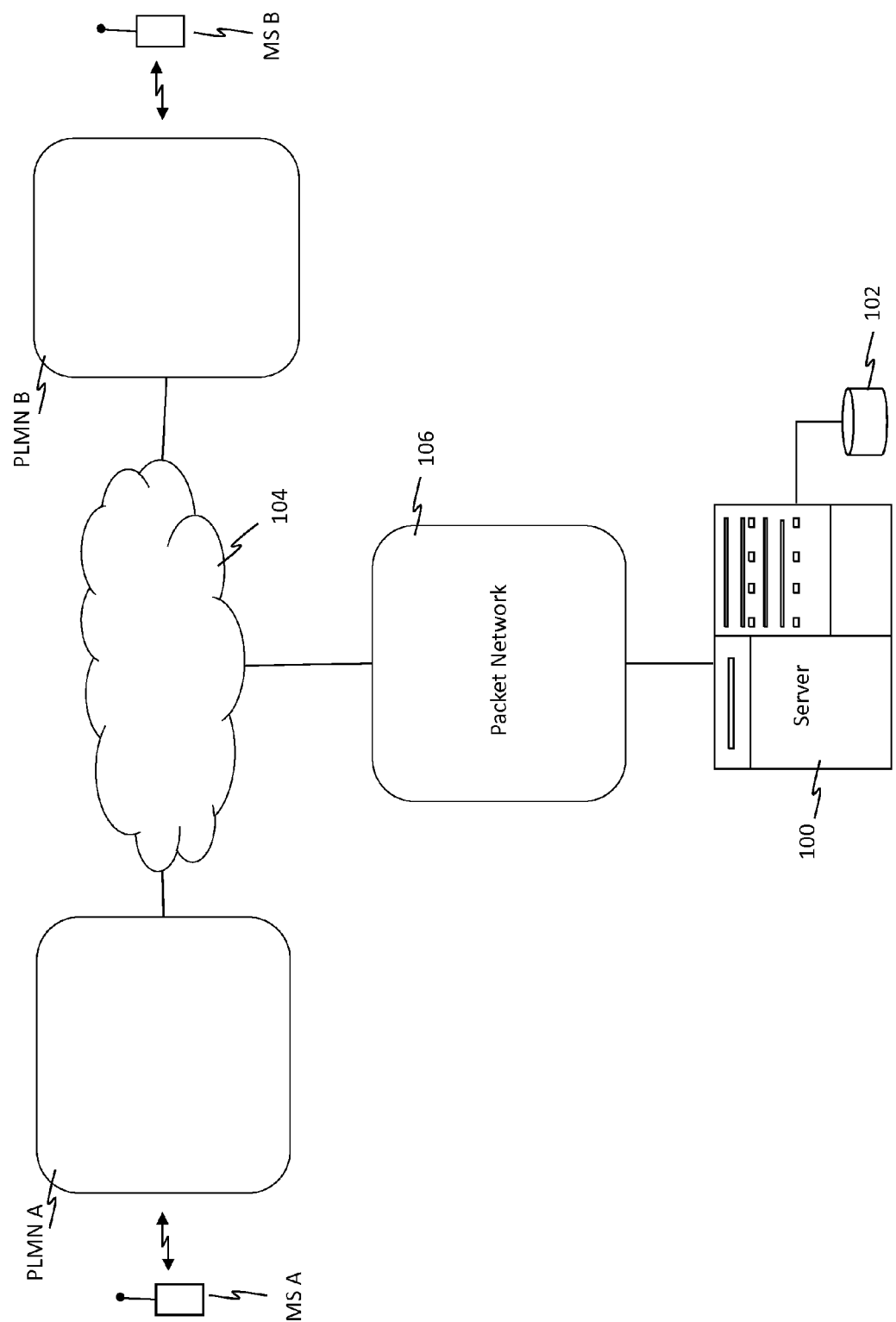
FIG. 1 is a system diagram according to embodiments of the invention.

FIG. 1 is a system diagram showing a data communications network according to embodiments of the present invention. These embodiments involve two mobile stations (MS) MS A and MS B which access public land mobile networks (PLMNs) PLMN A and PLMN B respectively via radio interfaces. MS A and MS B may be smart phones having data processing capabilities and operating systems.

PLMN A and PLMN B contain mobile telephony network infrastructure including one or more mobile switching centres, one or more base station controllers, and one or more base transceiver stations; the function of such entities is well known in the art and will not be described in detail here.

PLMN A and PLMN B are connected via a telecommunications network 104 comprising one or more Public Switched Telephone Networks (PSTNs) and/or packet networks. Telecommunications network 104 comprises one or more media and/or signalling gateway entities (not shown) for performing conversion between the various protocols and data formats used to transfer media and signalling data within and between the different networks. Server 100 has an associated data store 102 and is connected to telecommunications network 104 via a packet network 106.

Although server 100 is depicted as a single entity in FIG. 1, server 100 may be a single device, a cluster of servers or servers distributed throughout the data communications network.

MS A has an associated identity in the form of a telephone dialling number (TDN), TDN A. MS B has an associated identity in the form of a telephone dialling number TDN B. MS A has communication session application software running on it with an associated application identifier AppID A. MS B also has communication session application software running on it with an associated application identifier AppID B.

In some embodiments of the invention, during installation of the application software on MS A, server 100 may be informed of AppID A and creates a record for MS A in data store 102 containing AppID A stored in association with TDN A. Similarly, in some embodiments of the invention, during installation of the application software on MS B, server 100 may informed of AppID B and creates a record for MS B in data store 102 containing AppID B stored in association with TDN B.

Figure 2:
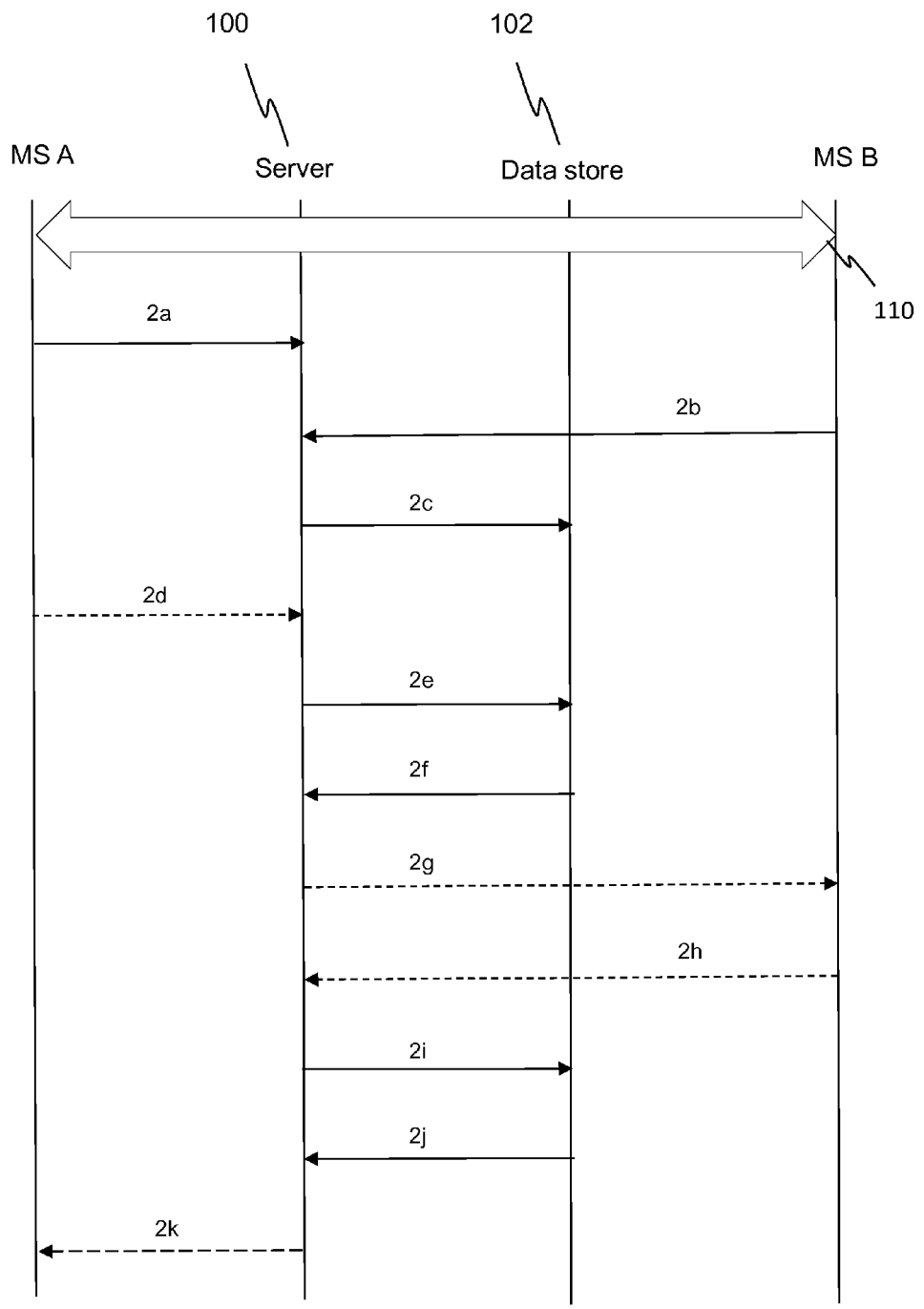
FIG. 2 is a flow diagram depicting operation of embodiments of the invention using the system of FIG. 1.

FIG. 2 is a flow diagram depicting operation of embodiments of the invention, for example implemented in a system depicted in FIG. 1.

In this and subsequent flow diagrams, solid arrows denote transfer of control, messaging or signalling data, whereas dashed arrows denote transfer of media or payload data.

A voice call is currently in progress between MS A in PLMN A and MS B in PLMN B, as shown by item 110. The voice call will typically be a circuit-switched voice call, the set-up and control for which is known in the art.

Application software running on MS A detects that there is a call in progress between MS A and MS B and notifies server 100 of call party details for the call, e.g. the TDNs of telephones involved in the call, TDN A associated with MS A and TDN B associated with MS B, in step 2a. Similarly, application software running on MS B detects the call in progress between MS B and MS A and notifies server 100 of call party details for the call, e.g. the TDNs of telephones involved in the call, TDN A associated with MS A and TDN B associated with MS B, in step 2b.

Application software running on MS A may detect that the call is in progress by registering with the operating system of MS A to be notified upon start of a call involving MS A. This could for example involve registering with an application programming interface (API) of the operating system of MS A associated with start and end of call events. A similar call detection process may occur on MS B.

In these embodiments, the user of MS A could be the calling or the called party for the call. Call party details are received from both telephony apparatus acting on behalf of the calling party and telephony apparatus acting on behalf of the called party for the call, e.g. telephony device MS A and telephony device MS B.

Server 100 identifies that the notification of step 2a from MS A and notification of step 2b from MS B have call party details, TDN A and TDN B, in common and establishes a separate communications session, separate from the telephone call, for the communication of data between MS A and MS B. The separate communications session is established on the basis of the received call party details, TDN A and TDN B. The separate communications session is established whilst the telephone call is in progress, and is continued in parallel with the telephone call, such that voice call data is transmitted via the telephone call and other data may be transmitted via the communications session, after the establishment of the separate communications session.

Server 100 updates the records for MS A and MS B in data store 102 to indicate that a call is in progress between MS A and MS B and that a communications session between MS A and MS B, separate to the voice call between MS A and MS B, has been established in step 2c.

Server 100 may respond (not shown) to the notifications of steps 2a and 2b by responding with respective acknowledgements to MS A and MS B.

If MS A wants to communicate data to (e.g. share data with) MS B, it transmits the data to server 100 in step 2d. Server 100 performs a lookup in data store 102 using TDN A for MS A in step 2e and identifies that a communications session has been established between MS A and MS B. Server 100 retrieves TDN B for MS B in step 2f and transmits the data received from MS A to MS B using the retrieved TDN B in step 2g.

In embodiments of the invention, the lookup in data store 102 of step 2e may also result in AppID B being retrieved. The data may then be transmitted to MS B using both TDN B and AppID B, with TDN B being used to locate MS B and AppID B being used to direct the data to the communications session application software running on MS B. The data may be transmitted by means of a push notification directed to AppID B of the communication session application on MS B. In the case of MS B being an Apple® iPhone®, the push notification could employ use of the Apple® Push Notification Service (APNS).

If MS B wants to send data to MS A, it sends the data to server 100 in step 2h. Server 100 performs a lookup in data store 102 using TDN B for MS B in step 2i and identifies that a communications session has been established between MS B and MS A. Server 100 retrieves TDN A for MS A in step 2j and transmits the data received from MS B to MS A using the retrieved TDN A in step 2k.

In embodiments of the invention, the lookup in data store 102 of step 2j may also result in AppID A being retrieved. The data may then be transmitted to MS A using both TDN A and AppID A, with TDN A being used to locate MS A and AppID A being used to direct the data to the communications session application software running on MS A. The data may be transmitted by means of a push notification directed to AppID A of the communication session application on MS A.

In embodiments of the invention, the communication session is established in the form of a client-server relationship, with server 100 acting as the server and each of MS A and MS B acting as clients. One connection is created between server 100 and MS A and another connection is created between server 100 and MS B. The two connections together create a channel between MS A and MS B through which data can be communicated in either direction.

In embodiments of the invention, server 100 establishes client-server connections with MS A and MS B in response to receiving one or more client-server connection requests.

In embodiments of the invention, a client-server connection request is transmitted in response to the telephone call being established between MS A and MS B. In other embodiments, a client-server connection request is transmitted in response to initiation of a data communications service on MS A or MS B after the telephone call is established between them.

Each of the connections could be HyperText Transfer Protocol (HTTP) or HyperText Transfer Protocol Secure (HTTPS) connections.

To avoid loss of the channel between MS and MS B, the connections can be maintained by maintenance messages ('heartbeats') transmitted from server 100 to MS A and MS B, for example transmitted at periodic intervals sufficiently short to prevent time-out of the connections due to inactivity, e.g. a client-server connection can be maintained by transmitting a message to keep the connection alive if the telephone call lasts more than a connection threshold period.

The data communicated via the session may comprise server 100 receiving data identifying a downloadable resource, selected from the group consisting of a photographic image data file; a word processing document data file; a spreadsheet document data file; a presentation document data file; a video image data file; and streaming video, from one of MS A and MS B, during the separate communications session, and transmitting the data to the other of MS A and MS B, for example via the client-server connection.

In embodiments of the invention, the communications session between MS A and MS B can be maintained after the voice call is terminated allowing the users of MS A and MS B to continue communicating data between their user devices.

In alternative embodiments of the invention, the separate communications session is established via server 100 and data is transmitted via a data communication path between MS A and MS B which is established on the basis of information received from said server, but with server 100 not being including in the data communication path.

Server 100 may receive a service data object from MS A or MS B during the separate communications session and transmit the service data object to the other of MS A and MS B.

Server 100 may receive a service data object from MS A or MS B during the separate communications session, process the service data object in combination with additional service data to generate derived service data; and transmit the derived service data to the other of MS A and MS B.

Figure 3:
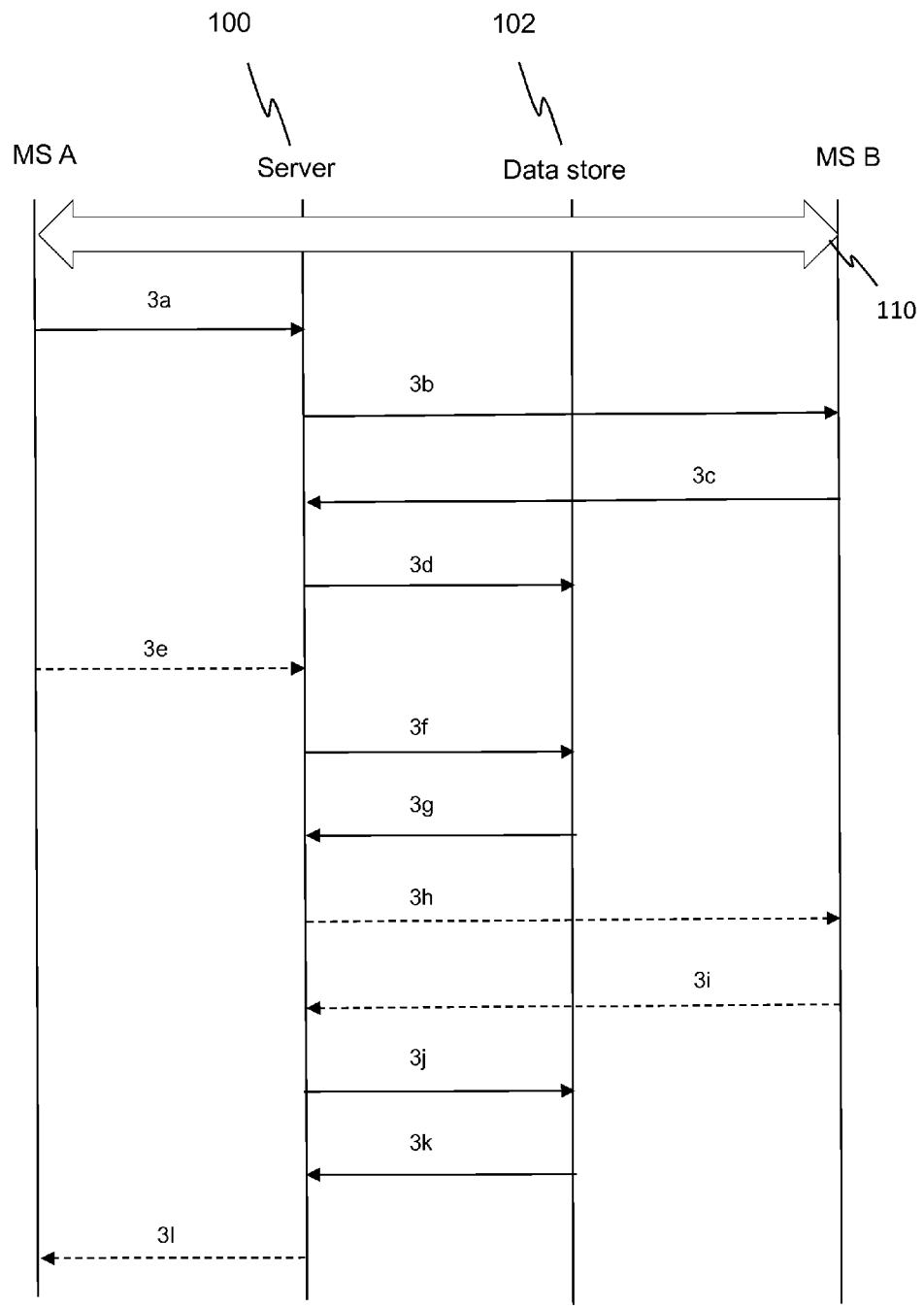
FIG. 3 is a flow diagram depicting operation of embodiments of the invention using the system of FIG. 1.

FIG. 3 is a flow diagram depicting operation of embodiments of the invention, for example implemented in a system depicted in FIG. 1. Similarly to FIG. 2 described above, a voice call is currently in progress between MS A in PLMN A and MS B in PLMN B, as shown by item 110.

Application software running on MS A detects that there is a call in progress between MS A and MS B and notifies server 100 of call party details for the call, e.g. the TDNs of telephones involved in the call, TDN A associated with MS A and TDN B associated with MS B, in step 3*a*. Here, however, MS B does not have application software or any other capability which can detect the call with MS A and notify server 100 of such. Instead, server 100 notifies MS B of the receipt of call party details for the call from MS A by transmitting a separate communication session initiation request to MS B in step 3*b*. The communication session initiation request may cause a message such as "Do you want to establish a data communication session with the party you are speaking to?" or such like. If the user of MS B accepts the request by appropriate user input, MS B transmits a separate communication session initiation response to server 100 in step 3*c* indicating that a communication session between MS B and MS A, separate to the voice call, should be established.

In these embodiments, the user of MS A could be the calling or the called party for the call. Call party details are received from either telephony apparatus acting on behalf of the calling party or telephony apparatus acting on behalf of the called party, e.g. MS A.

Once, the response of step 3*c* is received, server 100 updates the records for MS A and MS B in data store 102 in step 3*d* to indicate that a call is in progress between MS A and MS B and that a separate communications session between MS A and MS B should be established.

Similarly to FIG. 2 described above, server 100 establishes a separate communications session, separate from the telephone call, for the communication of data between MS A and MS B. The separate communications session is established on the basis of the received call party details, e.g. TDN A and TDN B, whilst the telephone call is in progress, and is continued in parallel with the telephone call, such that voice call data is transmitted via the telephone call and other data can be transmitted via the communications session, after the establishment of the separate communications session.

Communication of data from MS A to MS B can now occur in steps 3*e* to 3*h* by a similar process to that described above for steps 2*d* to 2*g* in relation to FIG. 2. Further, communication of data from MS B to MS A can now occur in steps 3*i* to 3*l* in a similar process to that described above for steps 2*h* to 2*k* in relation to FIG. 2.

Figure 4:
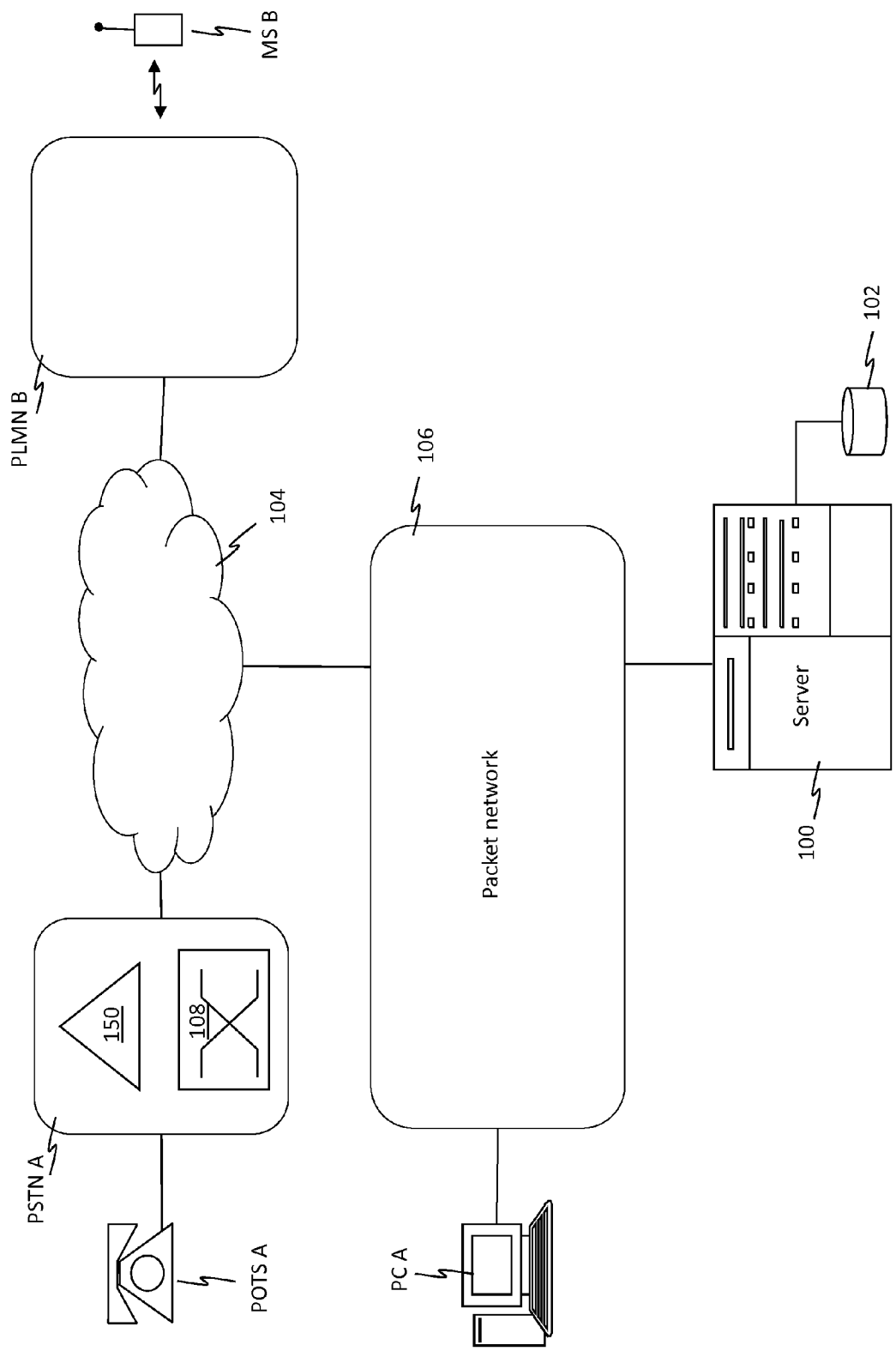
FIG. 4 is a system diagram according to embodiments of the invention.

FIG. 4 is a system diagram showing a data communications network according to embodiments of the present invention. FIG. 4 includes some entities similarly depicted and labelled to FIG. 1, with such entities functioning in a similar manner.

The embodiments of FIG. 4, however, involve an analogue telephone (sometimes referred to as a Plain Old Telephone Service (POTS) telephone or a 'black phone'), denoted POTS A, located in PSTN A, and a mobile station MS B located in PLMN B. PSTN A and PLMN B are connected via a telecommunications network 104 comprising one or more PSTNs and/or packet networks. Further, the user of POTS A also has an associated personal computer PC A connected to packet network 106.

In these embodiments of the invention, the user of POTS A cannot conduct communications sessions separate to voice calls conducted via POTS A just using POTS A alone. The user of POTS A therefore additionally employs PC A through which separate communications sessions can be conducted. To provide both voice calls via POTS A and separate communication sessions via PC A, POTS phone and PC A are coupled together logically.

POTS A has an associated telephone dialling number TDN A and MS B has an associated telephone dialling number TDN B. PC A has an associated network address in the form of an Internet Protocol (IP) address IP A in packet network 106. MS B has communications session application software running on it with an associated identifier AppID B.

PSTN A includes a network element 108 in the form of a call switching element, sometimes referred to as a Service Switching Point (SSP), which is capable of detecting whether a query should be raised in relation to calls to/from particular telephone dialling numbers by analysing in-call signalling information for the calls. Network element 108 acts on behalf of the user of POTS A and PC A and is configured to trigger a query, e.g. hand call control, to a service control point (SCP) network node 150 when it detects a predetermined call state for a call to/from TDN A associated with POTS A, for example by use of an Intelligent Network (IN) or Advanced Intelligent Network (AIN) call origination/termination trigger. SCP 150 is a network node responsible for deciding upon how such queries should be dealt with and acting accordingly, for example responding to network element 108 with appropriate instructions. The query from network element 108 to SCP 150 may pass via one or more Signalling Transfer Points (STPs) (not shown).

Upon receipt of in-call signalling information relating to a query from network element 108, SCP 150 is configured to trigger notification of such to server 100. Any such notification to server 100 will include call party details for the call, e.g. the TDNs of telephones involved in the call, TDN A associated with POTS A and TDN B associated with MS B.

Configuration of SCP 150 may involve storing an IP address for server 100 in association with TDN A, such that when in-call signalling information relating to a call to/from POTS A is received, notification to server 100 at the stored IP address is triggered.

In the embodiments of FIG. 4, POTS A has no communication session application software running on it. Further, POTS A has no capability to generate notifications when a call is outgoing from or incoming to POTS A.

Instead, PC A has communication session application software running on it for facilitating communication sessions according to embodiments of the invention.

During installation of the communication session application software on PC A, server 100 is informed that PC A and POTS A are to be coupled together logically. PC A sends IP A and TDN A to server 100 which creates a record for the user of POTS A and PC A in data store 102 containing IP A stored in association with TDN A. Similarly, during installation of the application software on MS B, server 100 is informed of AppID B and creates a record for MS B in data store 102 containing AppID B stored in association with TDN B.

Figure 5:
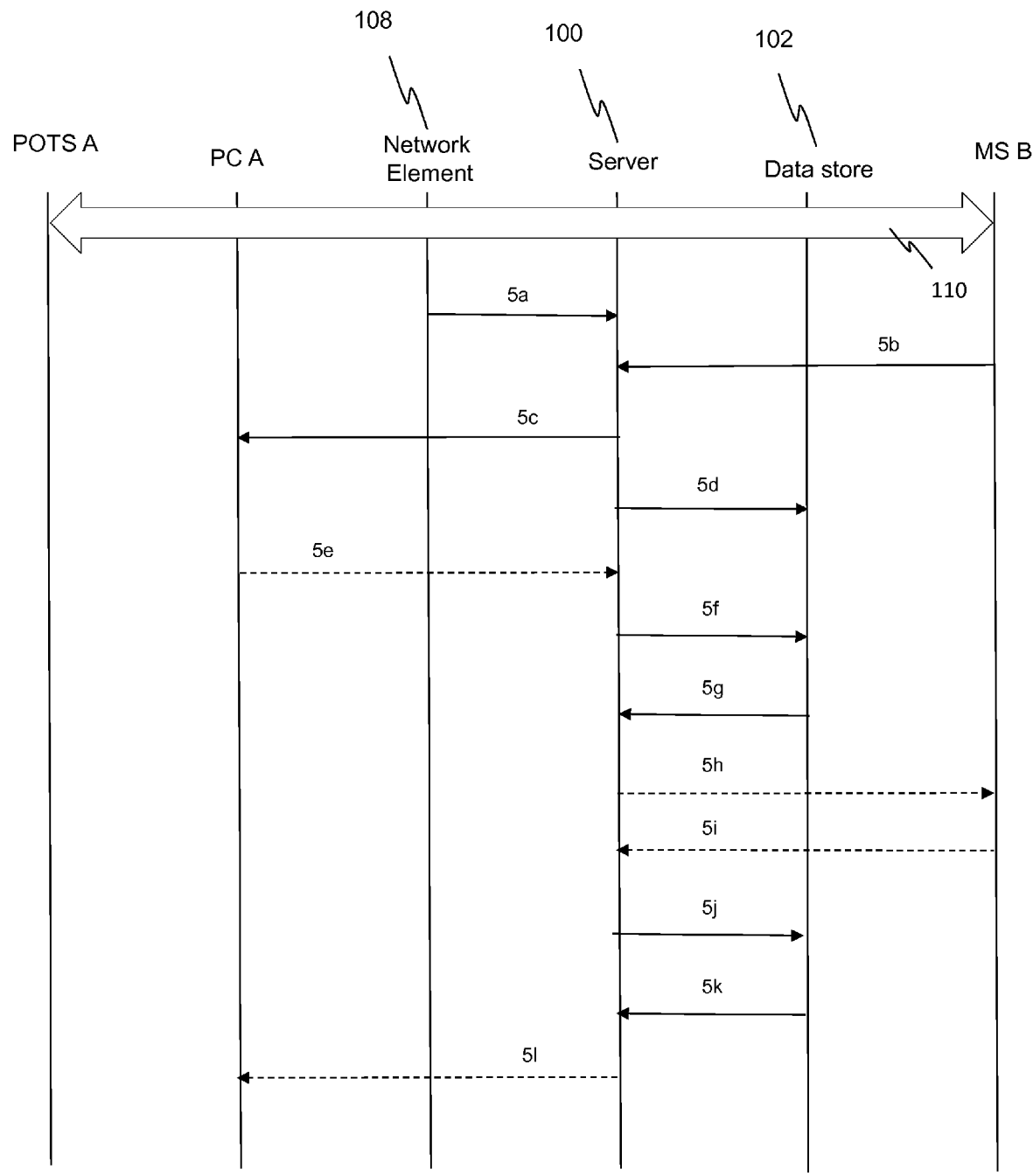
FIG. 5 is a flow diagram depicting operation of embodiments of the invention using the system of FIG. 4.

FIG. 5 is a flow diagram depicting operation of embodiments of the invention, for example implemented in a system depicted in FIG. 4. Similarly to FIG. 2 described above, a voice call is currently in progress between POTS A in PSTN A and MS B in PLMN B, as shown by item 110.

In the case of an outgoing call being made by POTS A to MS B, network element 108 receives in-call signalling information for the call, including TDN A, for which an AIN call origination trigger is configured. This triggers notification of call party details for the call to server 100 in step 5a.

In the case of an incoming call being received by POTS A from MS B, network element 108 receives in-call signalling information for the call, including TDN, for which an AIN call termination trigger is configured. This triggers notification of call party details for the call to server 100 in step 5a.

A call termination/origination trigger relating to a call to/from POTS A will include call party details for the call, e.g. the TDNs of telephones involved in the call, TDN A associated with POTS A and TDN B associated with MS B.

Application software running on MS B detects the call in progress between MS B and POTS A and notifies server 100 of call party details for the call, e.g. the TDNs of telephones involved in the call, TDN A associated with POTS A and TDN B associated with MS B, in step 5b.

In these embodiments, the user of POTS A could be the calling or the called party for the call. Call party details are received from telephony apparatus acting on behalf of the calling party and telephony apparatus acting on behalf of the called party, e.g. network element 108 and MS B.

Server 100 identifies that the notification of step 5a from network element 108 and the notification of step 5b from MS B have call party details, TDN A and TDN B, in common, e.g. server 100 matches the call party details received on behalf of each respective party to the call.

Server 100 maps the identity TDN A of POTS A to the network address for PC A, e.g. IP A, by reference to data store 102. Alternatively, IP A may be received during the call along with the call party details.

Server 100 establishes a communications session, separate from the telephone call between POTS A and MS B, for the communication of data between PC A and MS B. The separate communications session is established on the basis of the received call party details, e.g. TDN A and TDN B. Once the separate communications session is established, voice call data is transmitted via the telephone call and other data can be transmitted via the separate communications session.

Server 100 notifies PC A via IP A that a call has been detected between POTS A and MS B and that a separate communications session has been established between PC A and MS B in step 5c.

Server 100 updates the records for POTS A/PC A and MS B in data store 102 in step 5d to indicate that a call is in progress between POTS A and MS B and that a separate communications session between PC A and MS B has been established.

If the user of POTS A and PC A wants to communicate data to MS B, the user sends the data using PC A to server 100 in step 5e. Server 100 performs a lookup in data store 102 using IP A for PC A in step 5f and identifies that a communications session has been established between PC A and MS B separately to the call taking place between POTS A and MS B. Server 100 retrieves TDN B for MS B in step 5g and transmits the data received from PC A to MS B using the retrieved TDN B in step 5h.

In embodiments of the invention, the lookup in data store 102 of step 5f may also result in AppID B being retrieved. The data may then be transmitted to MS B using both TDN B and AppID B, with TDN B being used to locate MS B and AppID B being used to direct the data to the communications session application software running on MS B.

If the user of MS B wants to send data to the user of POTS A and PC A, the user of MS B sends the data to server 100 in step 5i. Server 100 performs a lookup in data store 102 using TDN A for POTS A in step 5j and identifies that a communications session has been established between PC A and MS B separately to the call taking place between MS B and POTS A. Server 100 retrieves IP A for PC A in step 5k and transmits the data received from MS B to PC A using the retrieved IP A in step 5l.

In alternative embodiments of the invention, instead of both call party detail notifications being sent to server 100 in steps 5a and 5b, server 100 may instead notify MS B of the request from PC A to initiate establishment of a separate communications session in a similar manner to step 3b described above in relation to FIG. 3. Similarly to step 3c, MS B will then transmit a communication session initiation response (in response to user input on MS B indicating acceptance of the request) to server 100 indicating that a communication session separate to the voice call between POTS A and MS B should be established between MS B and PC A.

Similarly to embodiments of the invention described above in relation to FIG. 2, the communication session is established in the form of a client-server relationship, with server 100 acting as the server and each of PC A and MS B acting as clients. One connection is created between server 100 and PC A and another connection is created between server 100 and MS B. The two connections together create a channel between PC A and MS B through which data can be communicated in either direction.

In some embodiments of the invention, establishing the session comprises receiving a client-server connection request from PC A and establishing a client-server connection with PC A. In other embodiments of the invention, establishing the session comprises receiving a client-server connection request from MS B and establishing a client-server connection with MS B.

In embodiments of the invention, the client-server connection request is transmitted in response to the telephone call between POTS A and MS B being established. In other embodiments of the invention, the client-server connection request is transmitted in response to initiation of a data communications service on PC A after the telephone call between POTS A and MS B is established.

If the call between POTS A and MS B is terminated at any stage and server 100 receives an indication of such, a notification message may be transmitted to PC A to inform it of a change of state of the separate communication session.

In alternative embodiments of the invention, network element 108 is a call initiating element, for example configured to initiate the establishment of the telephone call between POTS A and MS B in response to a remote click-to-dial website action by a user.

Figure 6:
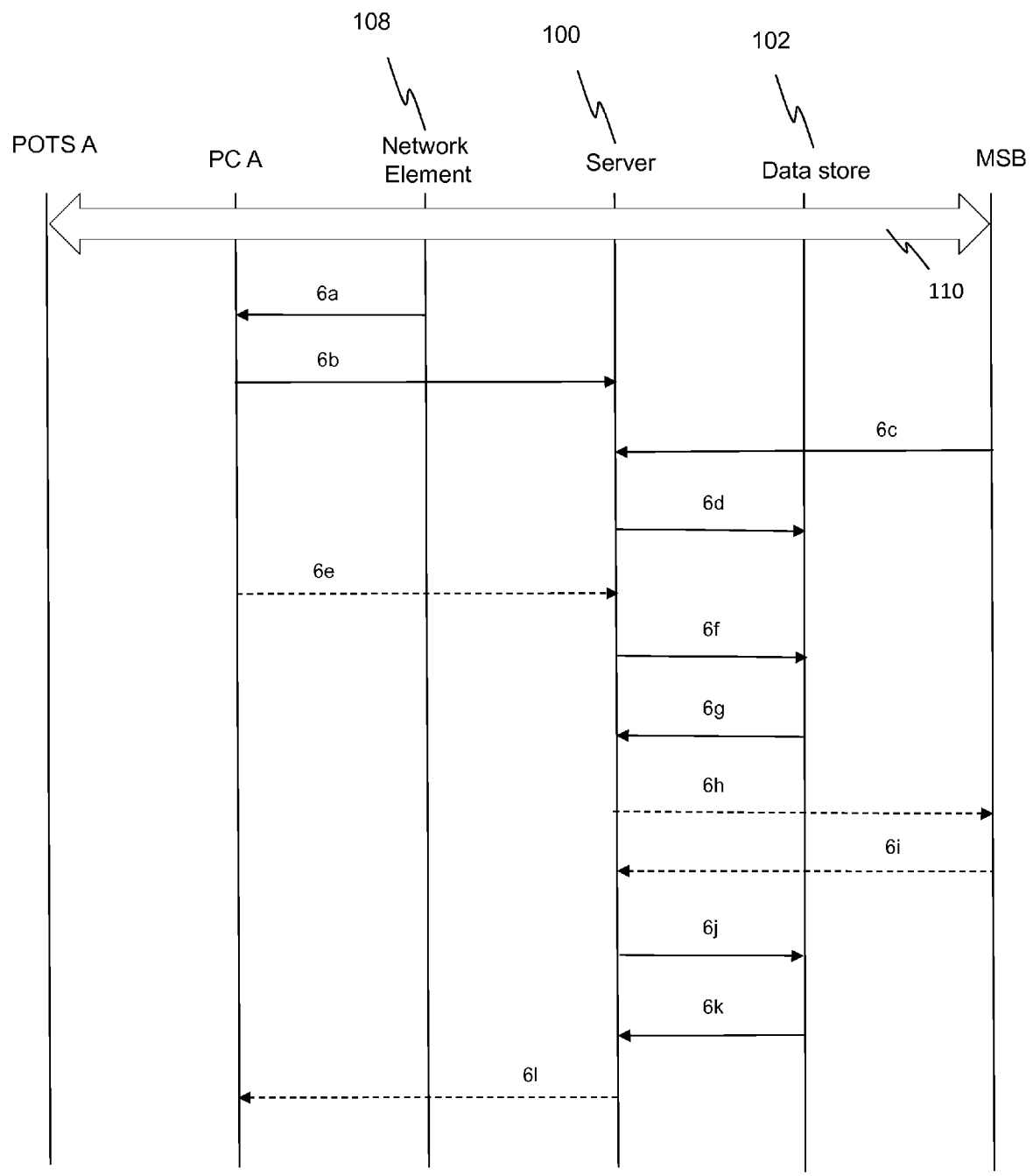
FIG. 6 is a flow diagram depicting operation of embodiments of the invention using the system of FIG. 4.

FIG. 6 is a flow diagram depicting operation of embodiments of the invention, for example implemented in a system depicted in FIG. 4. Network element 108 is configured similarly to network element 108 described above in relation to FIG. 4, e.g. when it detects a call to/from TDN A associated with POTS A, for example by use of an Advanced Intelligent Network (AIN) call origination/termination trigger, a query to SCP 150 is triggered. Here, however, SCP is configured such that upon receipt of in-call signalling information relating to a query from network element 108, notification to PC A is triggered, instead of notification to server 100. Any such notification to PC A will include call party details for the call, e.g. the TDNs of telephones involved in the call, TDN A associated with POTS A and TDN B associated with MS B.

Configuration of SCP 150 may involve storing an IP address IP A for PC A in association with TDN A, such that when a call is received to/from POTS A, PC A can be notified at the stored IP address.

In the embodiments of FIG. 6, when network element 108 detects the call being conducted between POTS A and MS B, it transmits call party details for the call, TDN A and TDN B, to PC A in step 6a. PC A forwards the call party details notification, including TDN A and TDN B, to server 100 in step 6b.

Application software running on MS B detects the call in progress between MS B and POTS A and notifies server 100 of call party details for the call, e.g. the TDNs of telephones involved in the call, TDN A associated with POTS A and TDN B associated with MS B, in step 6c.

In these embodiments, the user of POTS A could be the calling or the called party for the call. Call party details are received from telephony apparatus acting on behalf of the calling party and telephony apparatus acting on behalf of the called party, e.g. PC A and MS B.

Steps 6d to 6l of FIG. 6 then proceed in a similar manner to steps 5d to 5l described above in relation to FIG. 5.

Figure 7:
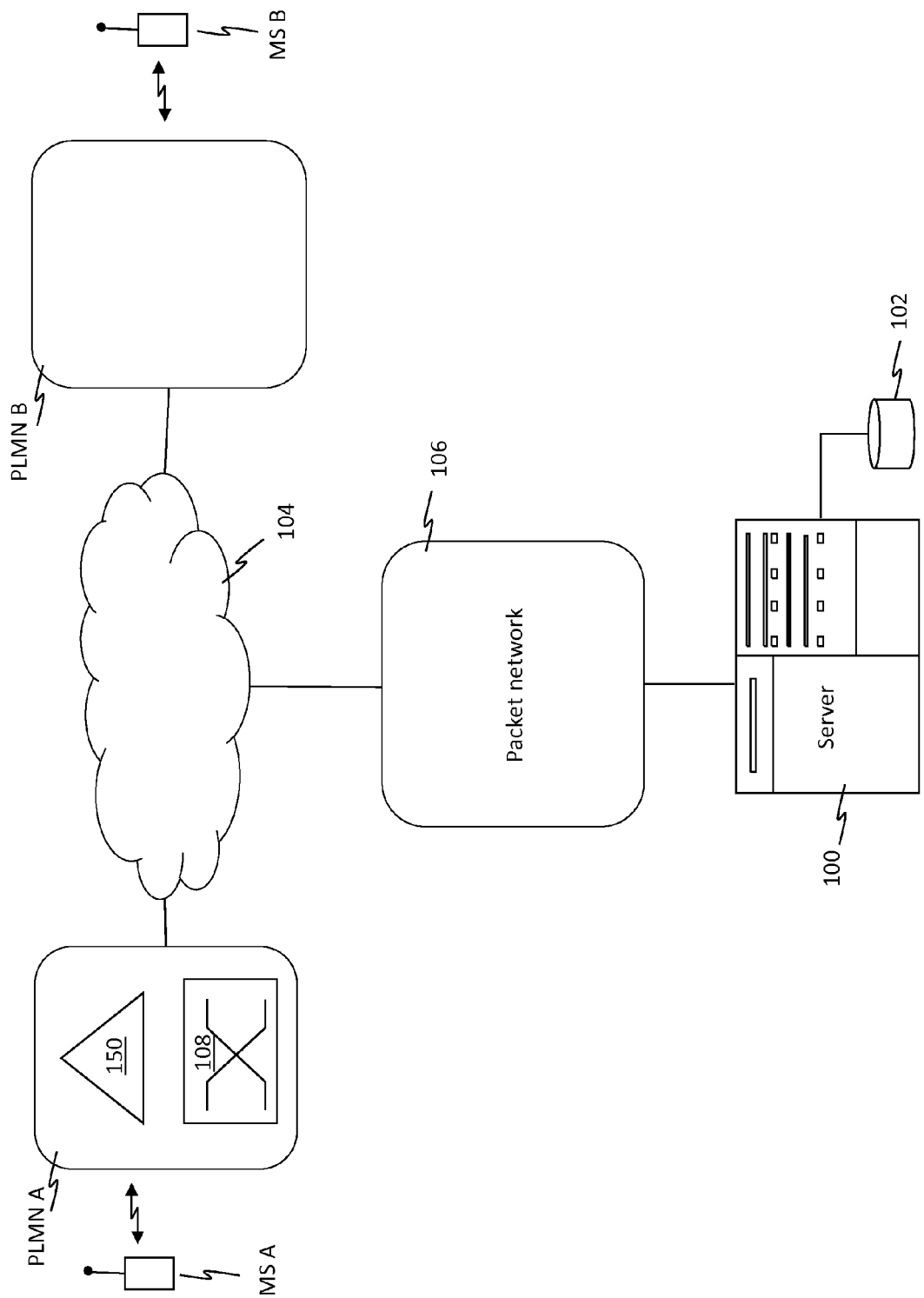
FIG. 7 is a system diagram according to embodiments of the invention.

FIG. 7 is a system diagram showing a data communications network according to embodiments of the present invention. FIG. 7 includes some elements similarly depicted and labelled to FIG. 4, with such elements functioning in a similar manner.

In the embodiments of FIG. 7, MS A has communication session application software running on it with an associated identifier AppID A. However, MS A does not have application software (or any other capability) for detecting calls to/from MS A and notifying server 100 of such.

MS B has communication session application software running on it with an associated identifier AppID B. In addition, MS B has application software running on it which is capable of detecting calls to/from MS B and notifying server 100 of such.

During installation of the communication session application software on MS A, server 100 is informed of AppID A and creates a record for MS A in data store 102 containing AppID A stored in association with TDN A. Similarly, during installation of the communication session application software on MS B, server 100 is informed of AppID B and creates a record for MS B in data store 102 containing AppID B stored in association with TDN B.

PLMN A includes a network switching element 108, for example an SSP, capable of generating queries in response to triggers configured for calls to/from MS A. Network element 108 of FIG. 7 generates queries to SCP 150 in a similar manner to network element 108 described above in relation to FIG. 4. The network element 108 of FIG. 4 generates queries in relation to wireline network triggers, for example Advanced Intelligent Network (AIN) triggers, generated within PSTN of FIG. 4. In FIG. 7, however, the queries are generated in relation to wireless network triggers such as Customised Applications for Mobile networks Enhanced Logic (CAMEL) or Wireless Intelligent Network (WIN) triggers.

Network switching element 108 is configured to trigger a query including in-call signalling information to a service control point (SCP) network node 150 when it detects a call to/from TDN A associated with MS A. Upon receipt of in-call signalling information relating to a query from network element 108, SCP 150 is configured to trigger notification of such to server 100. Any such notification to server 100 will include call party details for the call, e.g. the TDNs of telephones involved in the call, TDN A associated with POTS A and TDN B associated with MS B.

Configuration of SCP 150 may involve SCP 150 storing an IP address for server 100 in association with TDN A, such that when in-call signalling information relating to a call to/from POTS A is received, notification to server 100 at the stored IP address is triggered.

Figure 8:
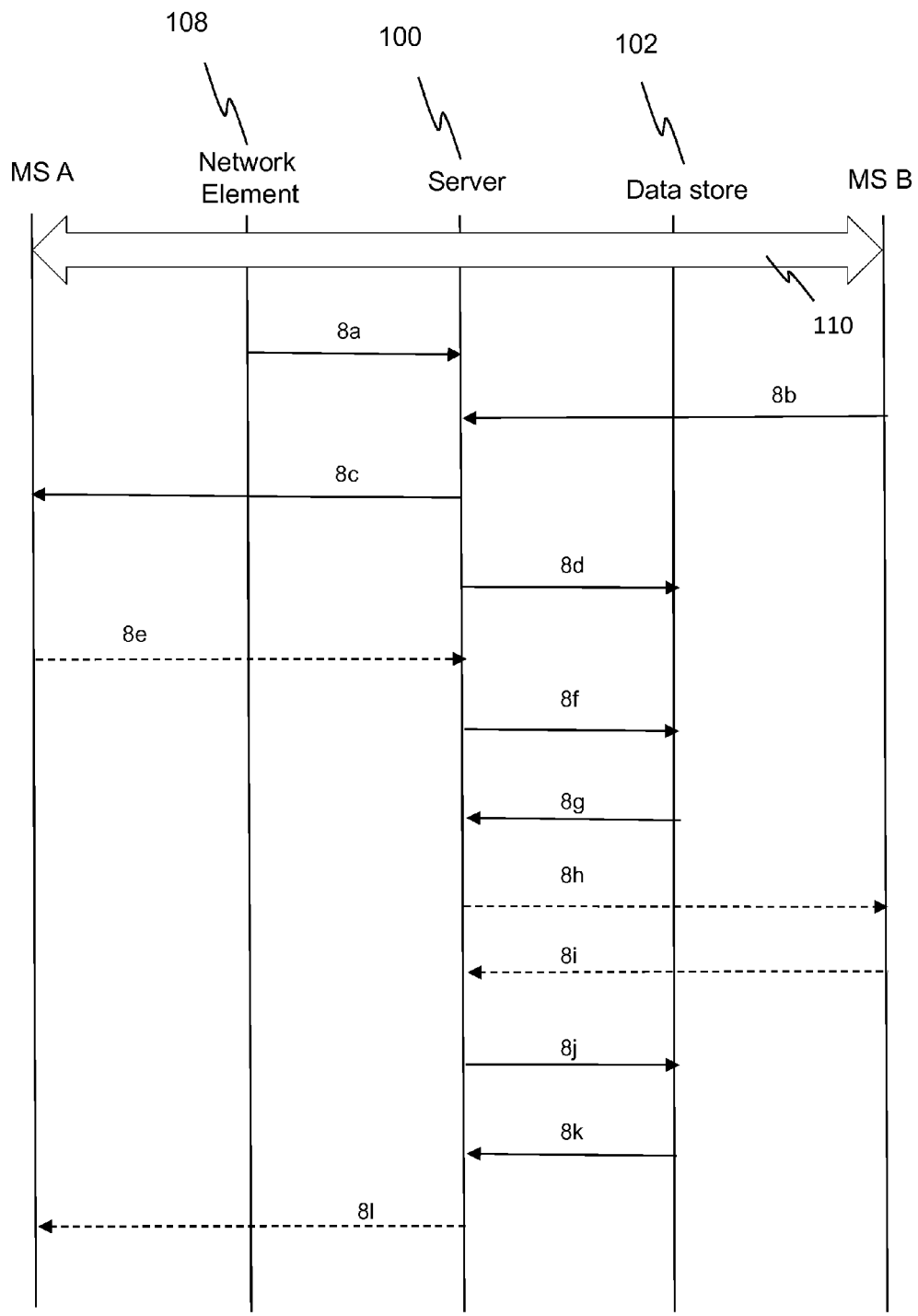
FIG. 8 is a flow diagram depicting operation of embodiments of the invention using the system of FIG. 7.

FIG. 8 is a flow diagram depicting operation of embodiments of the invention, for example implemented in a system depicted in FIG. 7. Similarly to FIG. 2 described above, a voice call is currently in progress between MS A in PLMN A and MS B in PLMN B, as shown by item 110.

In the case of an outgoing call being made by MS A to MS B, network element 108 receives in-call signalling information for the call, including TDN A, for which a wireless call origination trigger is configured. This triggers notification of call party details for the call to server 100 in step 8a.

In the case of an incoming call being received by MS A from MS B, network element 108 receives in-call signalling information for the call, including TDN A, for which a wireless call termination trigger is configured. This triggers notification of call party details for the call to server 100 in step 8a.

A call termination/origination trigger relating to a call to/from MS A will include call party details for the call, e.g. the TDNs of telephones involved in the call, TDN A associated with MS A and TDN B associated with MS B.

Application software running on MS B detects the call in progress between MS B and MS A and notifies server 100 of call party details for the call, e.g. the TDNs of telephones involved in the call, TDN A associated with MS A and TDN B associated with MS B, in step 8b.

In these embodiments, the user of POTS A could be the calling or the called party for the call. Call party details are received from telephony apparatus acting on behalf of the calling party and telephony apparatus acting on behalf of the called party, e.g. network element 108 and MS B.

Server 100 identifies that the notification of step 8a from network element 108 and the notification of step 8b from MS B have call party details, TDN A and TDN B, in common and establishes a communications session, separate from the telephone call between MS A and MS B, for the communication of data between MS A and MS B. The separate communications session is established on the basis of the received call party details, e.g. TDN A and TDN B. Once the separate communications session is established, voice call data is transmitted via the telephone call and other data can be transmitted via the separate communications session.

Server 100 notifies MS A that a call has been detected between MS A and MS B and that a separate communications session has been established between MS A and MS B in step 8c.

Server 100 updates the records for MS A and MS B in data store 102 in step 8d to indicate that a call is in progress between MS A and MS B and that a separate communications session between MS A and MS B has been established.

Communication of data from MS A to MS B can now occur in steps 8e to 8h by a similar process to that described above for steps 2d to 2g in relation to FIG. 2. Further, communication of data from MS B to MS A can now occur in steps 8i to 8l in a similar process to that described above for steps 2h to 2k in relation to FIG. 2.

In alternative embodiments of the invention, instead of both call party detail notifications being sent to server 100 in steps 8a and 8b, server 100 may instead notify MS B of the request from MS A to initiate establishment of a separate communications session in a similar manner to step 3b described above in relation to FIG. 3. Similarly to step 3c, MS B will then transmit a communication session initiation response (in response to user input on MS B indicating acceptance of the request) to server 100 indicating that a communication session separate to the voice call between MS A and MS B should be established between MS B and MS A.

Figure 9:
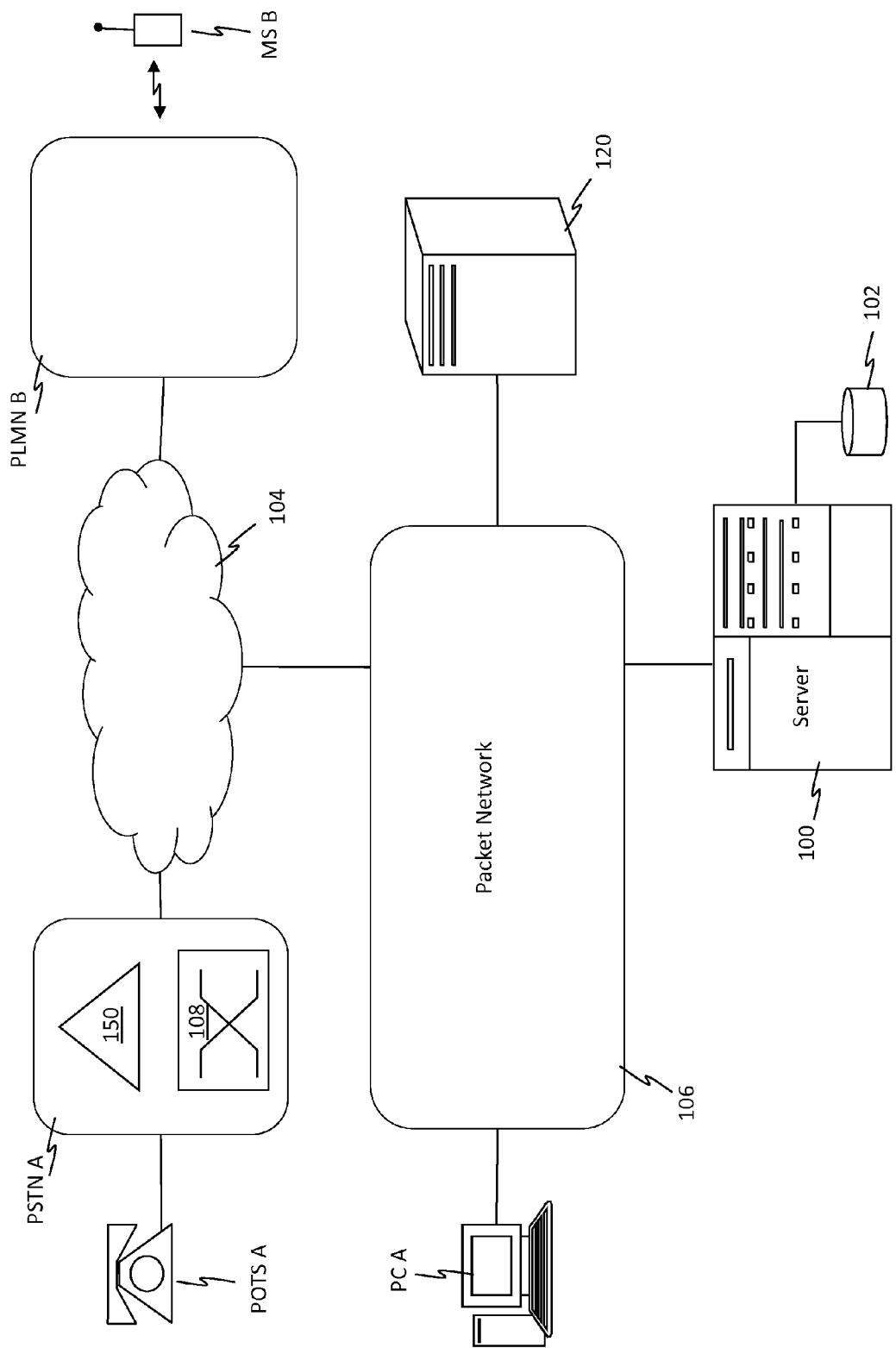
FIG. 9 is a system diagram according to embodiments of the invention.

FIG. 9 is a system diagram showing a data communications network according to embodiments of the present invention. FIG. 9 includes some entities similarly depicted and labelled to FIG. 4, with such entities functioning in a similar manner. In addition, the system of FIG. 9 includes a content server 120 connected to packet network 106 at which electronic content can be provided, for example via electronic download. The electronic content could comprise software components such as applications or plug-ins, or media data such as music, videos, computer games, etc.

Figure 10:
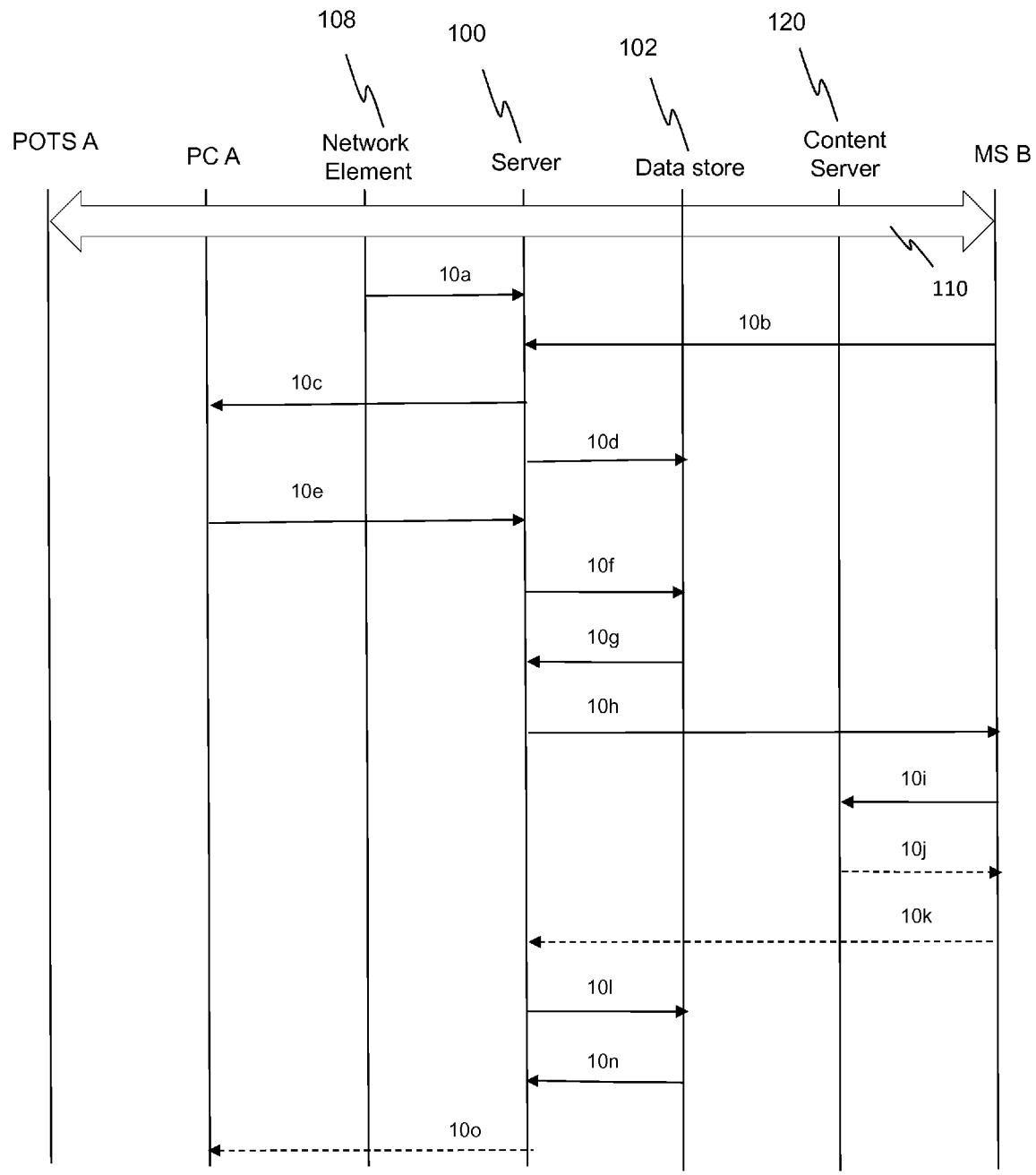
FIG. 10 is a flow diagram depicting operation of embodiments of the invention using the system of FIG. 9.

FIG. 10 is a flow diagram depicting operation of embodiments of the invention, for example implemented in a system depicted in FIG. 9. Similarly to FIG. 5 described above, a voice call is currently in progress between POTS A in PSTN A and MS B in PLMN B, as shown by item 110.

Similarly to steps 5a to 5d described above in relation to FIG. 5, steps 10a to 10d of FIG. 10 depict detection of a voice call between POTS A and MS B by network element 108 and notification of such to server 100, detection of the call between POTS A and MS B by MS B and notification of such to server 100, establishment of a separate communications session between PC A and MS B and notification of such to PC A, and updating of data store 102.

In these embodiments, the user of POTS A and PC A wishes to use a software component in the separate communications session with MS B and transmits from PC A an identifier for the software component, for example an application name, file name or Uniform Resource Locator (URL), to server 100 in step 10e. The software component may for example comprise a plug-in relating to the communications session application software installed on MS B and PC A.

Server 100 performs a lookup in data store 102 using IP A for PC A in step 10f and identifies that a communications session, separate to the voice call between POTS A and MS B, has been established between PC A and MS B. Server 100 retrieves TDN B for MS B in step 10g and proceeds to enable download of the software component by MS B.

Server 100 enables the download by transmitting the identifier for the software component received from PC A to MS B in step 10h. The identifier could be transmitted to MS B embedded in a text message such as an SMS message.

Using the received software component identifier, MS B sends a download request for the software component to content server 120 in step 10i. Content server then provides the software component to MS B in step 10j.

If the user of MS B wants to communicate data relating to use of the software component to the user of POTS A and PC A, MS B transmits such data to server 100 in step 10k. When server 100 receives the data from MS B in step 10k it performs a lookup in data store 102 using TDN B for MS B in step 10l and identifies that a separate communications session has been established between PC A and MS B. Server 100 retrieves IP A for PC A in step 10n and transmits the data received from MS B to PC A in step 10o. Data may be communicated from PC A to MS B in a similar manner as per steps 2h to 2k described above in relation to FIG. 2.

When server 100 receives the software component identifier in step 10e, it may identify that further information is required for downloading the software component, for example if only an application name is supplied by PC A. The further information could include an IP address, domain name or URL for locating content server 120 in packet network 106; such further information may be stored locally to server 100 or could be obtained via a search or query process carried out by server 100 within packet network 106 or beyond. In such a case, server 100 will additionally provide such further information to MS B in step 10h.

In alternative embodiments of the invention, when server 100 receives the software component identifier in step 10e, it performs a lookup in data store 102 and identifies that that a separate communications session has been established between PC A and MS B. Server 100 then downloads the software component from content server 120 itself using the software component identifier received from PC A, and transmits the software component directly to MS B.

In further alternative embodiments of the invention, instead of PC A transmitting an identifier for the software component to server 100 as per step 10e, PC A transmits the software component itself to server 100. Server 100 performs a lookup in data store 102 and identifies that that a separate communications session has been established between PC A and MS B and transmits the software component received from PC A to MS B.

In embodiments of the invention, before download of the software component to MS B or PC A is enabled, a capability check is conducted to determine whether MS B or PC A is initially enabled with the software component. If the capability check indicates that the respective user device is not initially enabled with the software component, then enabling of the download may proceed.

In some embodiments, capability data for one or more user devices is stored in data store 102 and server 100 may carry out a capability check by reference to data store 102. In other embodiments, the capability check involves transmitting a capability query to a user device, and receiving a response indicating whether said the device is initially enabled with the software component.

In embodiments of the invention, the separate communications session is established using a session establishment software application or operating system function on the user device to which the software component is being downloaded to and the software component is a software application which interoperates with the session establishment software application or operating system function.

In embodiments of the invention, a client-server connection request is transmitted by the user device to which the software component is being downloaded to server 100 and a client-server connection is established between server 100 and that device. The software component is transmitted via the established client-server connection. The client-server connection request could be transmitted in response to the telephone call being established or in response to a notification received during the telephone call, after the telephone call is established.

Figure 11:
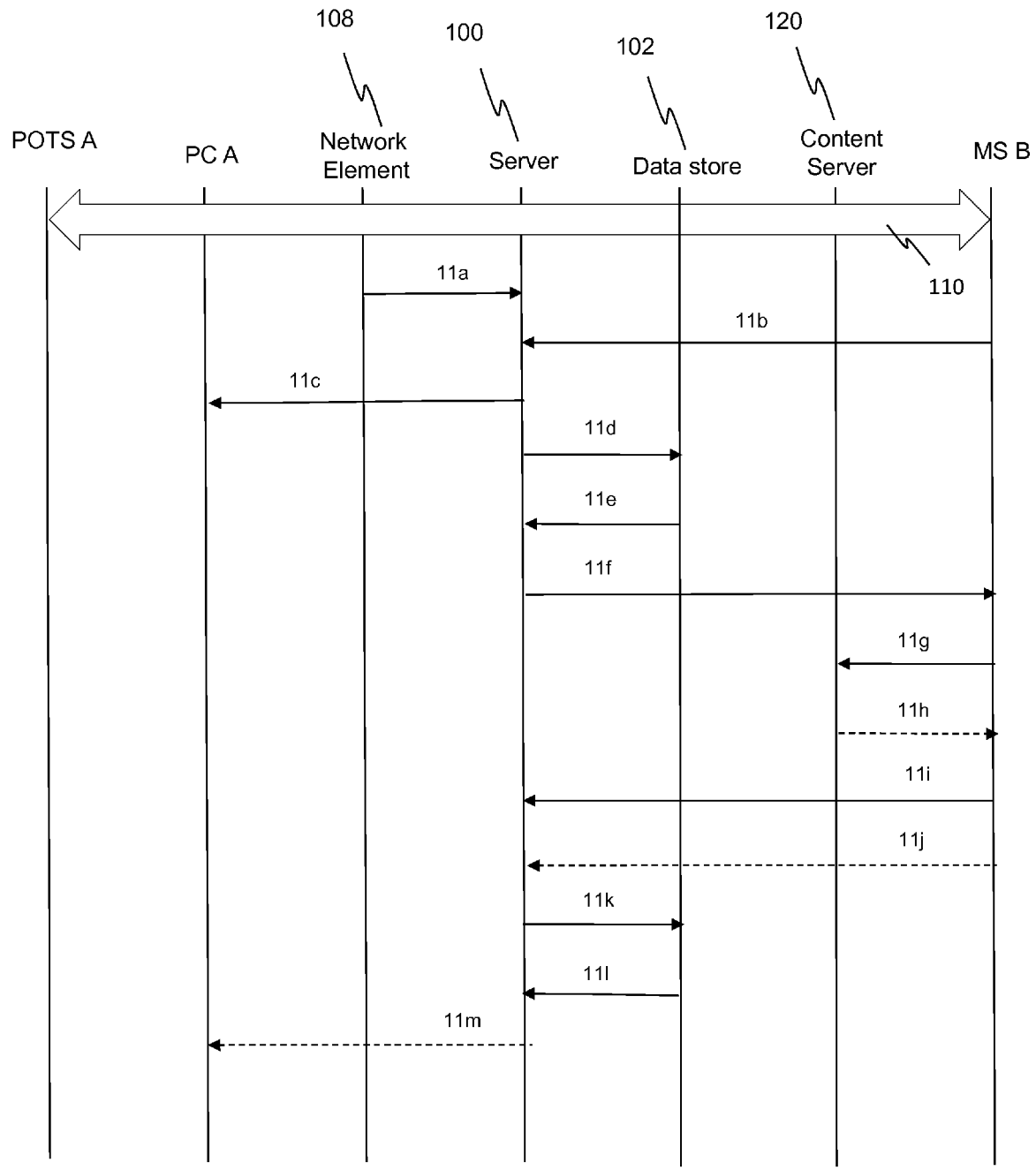
FIG. 11 is a flow diagram depicting operation of embodiments of the invention using the system of FIG. 9.

FIG. 11 is a flow diagram depicting operation of embodiments of the invention, for example implemented in a system depicted in FIG. 9. Similarly to FIG. 10 described above, a voice call is currently in progress between POTS A in PSTN A and MS B in PLMN B, as shown by item 110.

Steps 11a to 11c of FIG. 11 depict detection of a voice call between POTS A and MS B by network element 108 and notification of call party details for such to server 100, detection of the call between POTS A and MS B by MS B and notification of call party details for such to server 100, as well as notification of the detected call to PC A.

When server 100 receives the call party details for the call between POTS A and MS B in steps 11a and 11b, it performs a lookup in data store 102 for the TDNs of MS A and MS B in step 11d. From the lookup information received in step 11e, server 100 identifies that MS B is an initially non-enabled user device that does not currently have a capability associated with participating in a communication session separate to the voice call between POTS A and MS B.

For example, a data record for MS B in data store 102 may indicate that MS B does not have communications session software installed on it, or there may be no data record at all for MS B in data store 102 which also indicates that MS B does not have communications session software installed on it.

In these embodiments, in order to provide the initially non-enabled user device MS B with the capability associated with participating in the session, server 100 enables the download of a software application to the initially non-enabled user device MS B.

Server 100 enables the download of the software application by transmitting an identifier for the software application to MS B in step 11f. The identifier could be transmitted to MS B embedded in a text message such as an SMS message.

Using the received software application identifier, MS B sends a download request for the software application to content server 120 in step 11g. Content server then provides the software application to MS B in step 11h.

MS B proceeds to install the software application, which when installed, sends an installation confirmation message to server 100 in step 11i. Server 100 is now able to establish a communications session between PC A and MS B which is separate to the voice call being conducted between POTS A and MS B.

Once the separate communications session between MS B and PC A is established, MS B may communicate data to PC A as shown in steps 11j to 11m in a similar manner to steps 5i to 5l as described above in relation to FIG. 5. Further, communication of data from MS B to MS A can now occur (not shown) in a similar process to that described above for steps 5e to 5h in relation to FIG. 5.

In embodiments of the invention, establishment of the separate communications session may be initiated by the user of POTS A and PC A, for example by user input on PC A. The user input causes communications session software installed on PC A to transmit a communications session initiation request message to server 100 which then proceeds to establish a separate communications session as described above.

Figure 12:
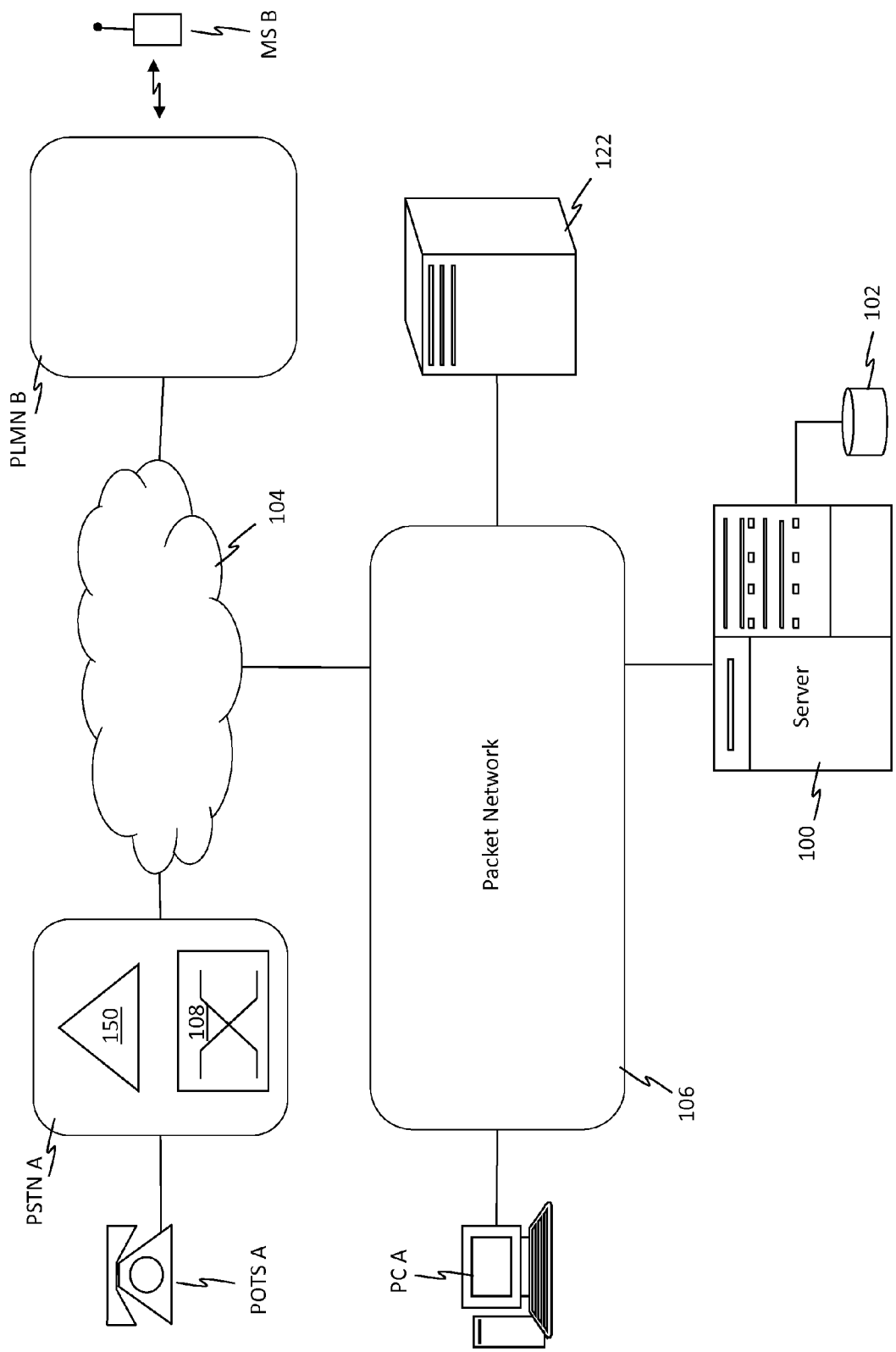
FIG. 12 is a system diagram according to embodiments of the invention.

FIG. 12 is a system diagram showing a data communications network according to embodiments of the present invention. FIG. 12 includes some entities similarly depicted and labelled to FIG. 4, with such entities functioning in a similar manner. In addition, the system of FIG. 12 includes an authorisation server 122 connected to packet network 106 at which authorisation for use of copyrighted electronic content can be requested and granted. The electronic content could comprise software components such as applications and plug-ins, or media data such as music, videos, etc.

Figure 13:
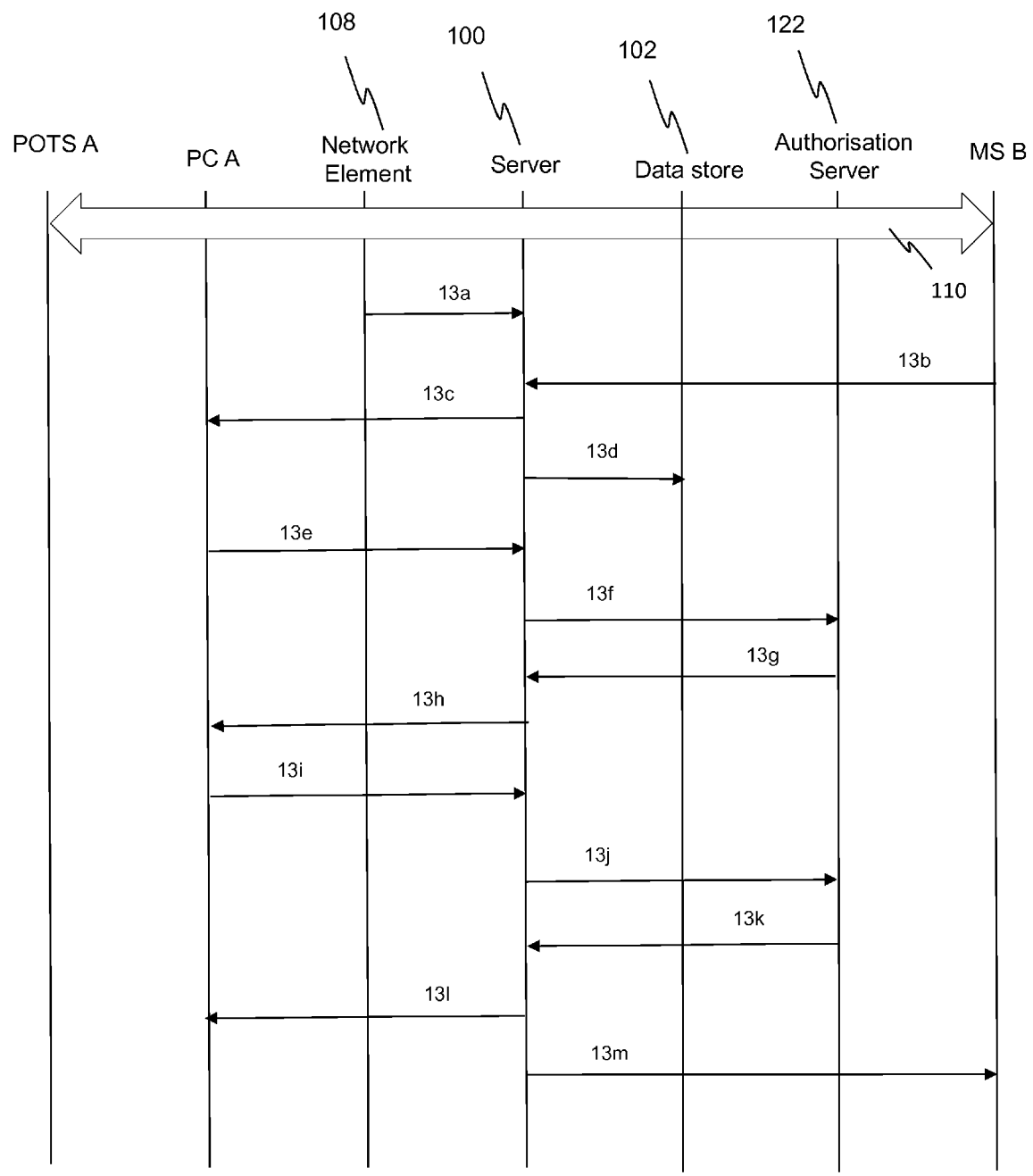
FIG. 13 is a flow diagram depicting operation of embodiments of the invention using the system of FIG. 12.

FIG. 13 is a flow diagram depicting operation of embodiments of the invention, for example implemented in a system depicted in FIG. 12. Similarly to FIG. 5 described above, a voice call is currently in progress between POTS A in PSTN A and MS B in PLMN B, as shown by item 110.

Similarly to steps 5a to 5d described above in relation to FIG. 5, steps 13a to 13d of FIG. 13 depict detection of a voice call between POTS A and MS B by network element 108 and notification of call party details for such to server 100, detection of the call between POTS A and MS B by MS B and notification of such to server 100, establishment of a separate communications session between PC A and MS B and notification of such to PC A, and updating of data store 102 accordingly.

In these embodiments, the user of POTS A and PC A, transmits from PC A an identifier identifying a feature of the communications session separate to the voice call between POTS A and MS B that requires authorisation for use by MS B in step 13e. The feature could for example be a software component or media data and the identifier could be a URL or other network address at which the feature can be located.

Upon receipt of the feature identifier, server 100 transmits an authorisation requirement query containing the feature identifier to authorisation server 122 in step 13f. The authorisation requirement query has the effect of asking the authorisation server whether authorisation for use of the identified feature by MS B in the separate communications session is required. Authorisation server 122 performs any appropriate checks, for example with reference to a copyright records database (not shown), and transmits an authorisation requirement response back to server 100 in step 13g. In this case, the authorisation requirement response of step 13g indicates that authorisation for use of the identified feature by MS B is required, for example "A copyright fee of $xx must be paid" for use of the identified feature in the separate communications session.

Server 100 now requests authorisation from the user of PC A and POTS A to authorise the use of the identified feature by MS B in the separate communications session in step 13h, for example asking the user of POTS A and PC A whether they are willing to accept the $xx copyright charge. The user of POTS A and PC A accepts the charge by appropriate input via PC A which results in an indication of authorisation being transmitted from PC A to server 100 in step 13i.

When server 100 receives the authorisation indication of step 13i from PC A, server 100 enables the use of the feature by MS B in the separate communications session. Server 100 contacts authorisation server 122 in step 13j requesting that authorisation for the identified feature be granted. Server 122 responds to server 100 with an authorisation grant in step 13k.

Granting authorisation may involve authorisation server contacting a payment server of an appropriate financial institution on behalf of the user device in question, for example to pay a copyright fee for use of the feature. The charge will generally be passed on to a an account associated with the user of POTS A and PC A because it is that user who is requesting use of the identified feature by the user of MS B in the separate communications session.

The user of PC A is informed that authorisation of the feature has been granted by a message transmitted from server 100 to PC A in step 13l, for example including confirmation of the amount charged to their account.

Server 100 enables use of the feature for MS B by transmitting an identifier for the feature along with an authorisation token proving that use of the feature by MS B has been authorised. The user of MS B can then download (not shown) or otherwise access the feature using the feature identifier and authorisation token received from server 100 without having to request authorisation (or pay for such). Download of the feature may involve contacting a content server such as item 120 in FIG. 9.

The authorisation token may include a purchase token proving that a copyright fee or suchlike has already been paid for use of the feature.

In some embodiments of the invention, the feature may involve using a service application which requires authorisation in order to process service data transmitted during the separate communications session. In alternative embodiments of the invention, the feature may involve accessing data which requires authorisation in relation to which an identifier is transmitted during the separate communications session.

Figure 14:
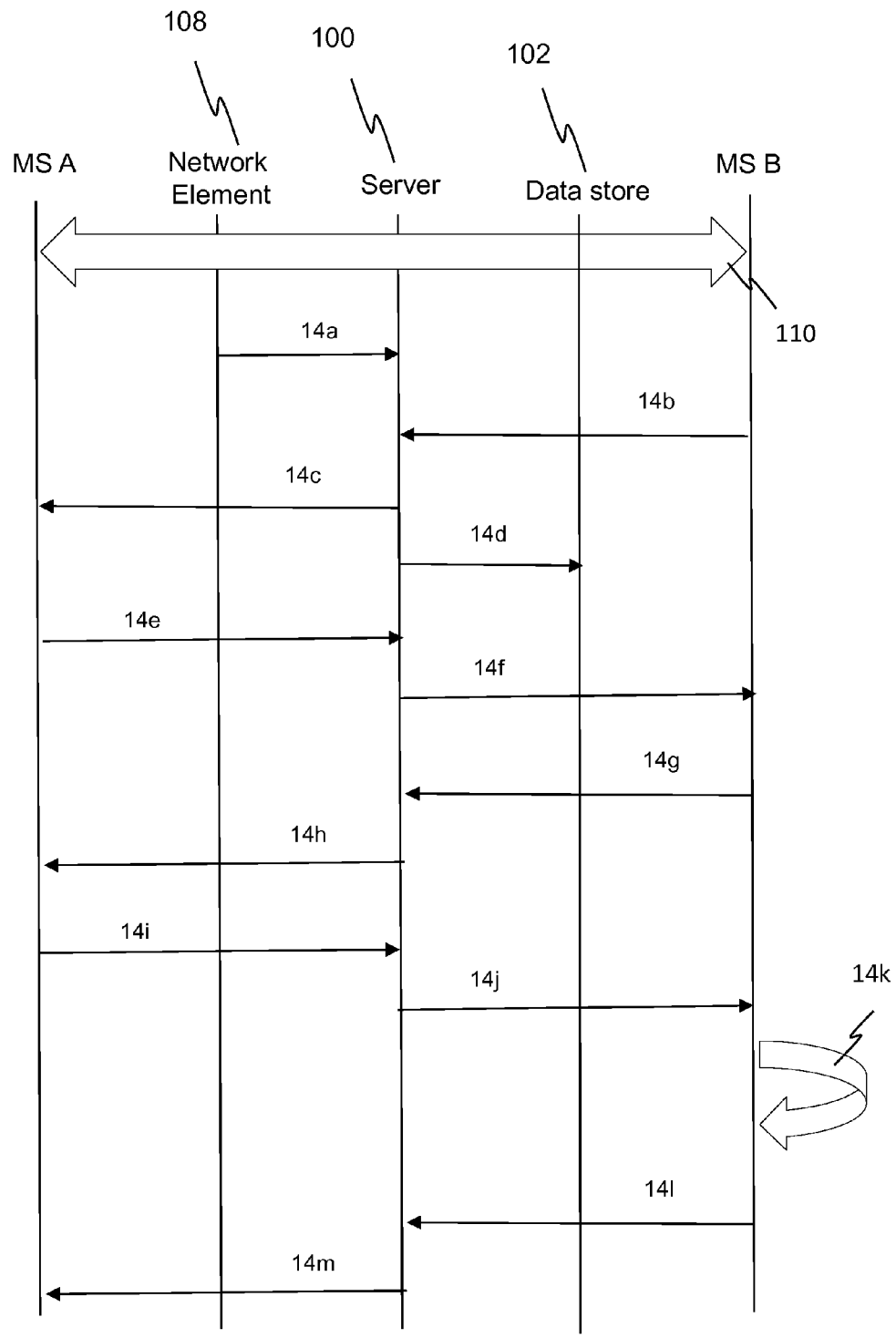
FIG. 14 is a flow diagram depicting operation of embodiments of the invention using the system of FIG. 12.

FIG. 14 is a flow diagram depicting operation of embodiments of the invention, for example implemented in a system depicted in FIG. 7. Similarly to FIG. 2 described above, a voice call is currently in progress between MS A in PLMN A and MS B in PLMN B, as shown by item 110. MS B and MS A include geographical location modules, such as Global Positioning System (GPS) modules, capable of receiving geographical location data based on the physical location of MS A and MS B respectively. MS A and MS B both have map creation applications for creating maps for display on MS A and MS B respectively.

FIG. 14 depicts embodiments where the geographical location of MS B is 'pulled' from MS B by MS A.

Network element 108 receives in-call signalling information for the call between MS A and MS B which triggers notification of call party details, including TDN A and TDN B, for the call to server 100 in step 14a.

Application software running on MS B detects the call in progress between MS B and MS A and notifies server 100 of call party details for the call, e.g. the TDNs of telephones involved in the call, TDN A associated with MS A and TDN B associated with MS B, in step 14b.

Server 100 identifies that the notification of step 14a from network element 108 and the notification of step 14b from MS B have call party details, TDN A and TDN B, in common and establishes a communications session, separate from the telephone call between MS A and MS B, for the communication of data between MS A and MS B. The separate communications session is established whilst the telephone call is in progress on the basis of the received call party details, e.g. TDN A and TDN B. Once the separate communications session is established, voice call data is transmitted via the telephone call and other data can be transmitted via the separate communications session.

Server 100 notifies MS A that a call has been detected between MS A and MS B and that a separate communications session has been established between MS A and MS B in step 14c.

Server 100 updates the records for MS A and MS B in data store 102 in step 14d to indicate that a call is in progress between MS A and MS B and that a separate communications session between MS A and MS B has been established.

In these embodiments, the user of MS A wishes to obtain geographical location data for MS B, for example to use in relation to a map creation application running on MS A. MS A transmits a geographical location capability check message to server 100 in step 14e; the capability check message is for checking the capability of MS B to provide geographical location data relating to its physical location, for example checking if MS B has a map creation application running on it.

Server 100 forwards the geographical location capability check message on to MS B in step 14f. Mobile station MS B responds by sending a geographical location capability response message to server 100 in step 14g which forwards this on to MS A in step 14h; the capability response message includes information as to whether MS B can provide geographical location data relating to its physical location.

In this embodiment of the invention, the capability response message informs MS A that MS B is able to provide geographical location data (by use of its geographical location module), so MS A transmits a request for geographical location data for MS B to server 100 in step 14i. Server 100 forwards the request from MS A to MS B in step 14j.

When MS B receives the request for geographical location data from server 100 in step 14j, MS B instructs its geographical location module to carry out a geographical location process and provide geographical location data relating to the physical location of MS B in step 14k. The geographical location data resulting from step 14k is transmitted to server 100 in step 14l. Server 100 then transmits data including or derived from the geographical location data received in step 14l to MS A in step 14m.

The map creation application of MS A can use the geographical location data received from server 100 in step 14m to create a map which incorporates a representation of the physical location of MS B. For example, the received geographical location data may include a grid reference or longitude and latitude parameters which can be processed by the map creation application to plot the location of MS B within a map stored or accessible by MS A. Such embodiments could for example be useful for the user of MS A to give directions to MS B verbally during the telephone call being conducted via MS A and MS B with reference to the created map and indication of the location of MS B thereon.

In embodiments of the invention, steps 14i to 14m are repeated, allowing display of a dynamically updating map on MS A that shows changes in the physical location of MS B as they happen. Alternatively, steps 14k to 14m can be repeated allowing updating of the map on MS A without further requests as per steps 14i and 14j being required.

In embodiments of the invention where MS B is not able to provide geographical location data, for example because MS B has no geographical location module or other such capability, the capability response message of step 14g will state so, thus informing MS A that communication of geographical location data from MS B is not possible. In alternative embodiments of the invention where MS B is not able to provide geographical location data, MS B may not send any capability response message, and after a predetermined period with no response being received, MS A might conclude that communication of geographical location data from MS B will not be possible.

In further alternative embodiments of the invention, the geographical location capability check message of step 14e can be combined with the request for geographical location data of step 14i and the geographical location capability response message of step 14g can be combined with the transmittal of geographical location data of step 14l.

Figure 15:
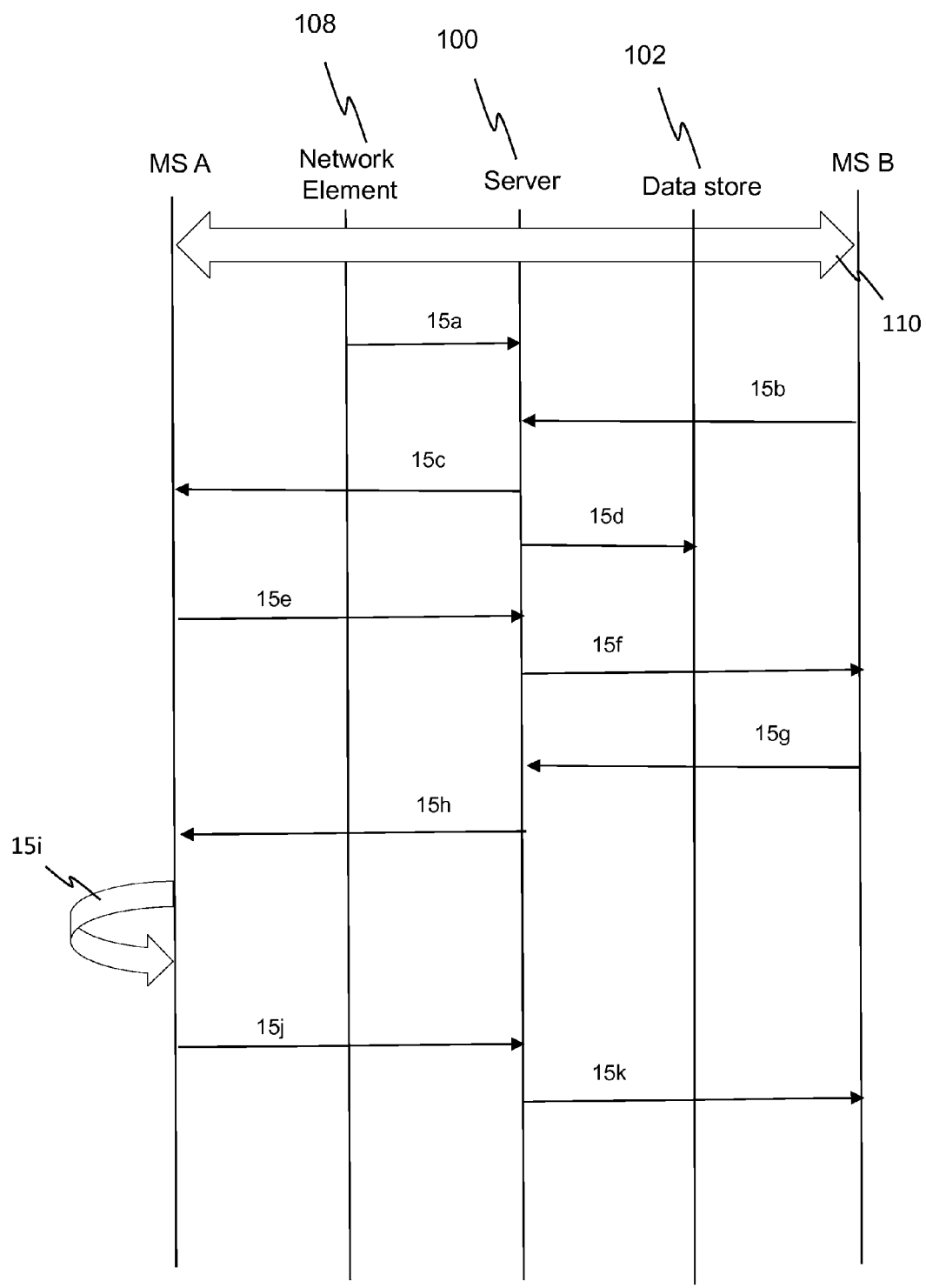
FIG. 15 is a flow diagram depicting operation of embodiments of the invention using the system of FIG. 12.

FIG. 15 is a flow diagram depicting operation of embodiments of the invention, for example implemented in a system depicted in FIG. 7. In FIG. 15, steps 15a to 15d occur in a similar manner as per steps 14a to 14d described above in relation to FIG. 14.

FIG. 15 depicts embodiments where the geographical location of MS A is 'pushed' from MS A to MS B.

In these embodiments, the user of MS A wishes to send geographical location data for MS A to MS B.

Embodiments of the invention involve MS A checking the capability of MS B to process and/or display geographical location data by transmitting a geographical location capability check message to server 100 in step 15e. Server 100 forwards the geographical location capability check message on to MS B in step 15f. Mobile station MS B responds by sending a geographical location capability response message to server 100 in step 15g which forwards this on to MS A in step 15h.

In this embodiment of the invention, the capability response message informs MS A that MS B is able to process geographical location data (by use of its map creation application), so the user of MS A triggers generation of appropriate geographical location data by appropriate input to the mapping application of MS A. Alternatively, generation of geographical location data could occur upon receipt of the capability response message of step 15*h* without any input from the user of MS A being required.

MS A instructs its geographical location module to carry out a geographical location process and provide geographical location data relating to the physical location of MS A in step 15*i*. The geographical location data resulting from step 15*i* is transmitted to server 100 in step 15*j*. Server 100 then transmits data including or derived from the geographical location data received in step 15*j* to MS B in step 15*k*.

The map creation application of MS B can use the geographical location data received from server 100 in step 15*k* to create a map which incorporates a representation of the physical location of MS A. Such embodiments could for example be useful for the user of MS B to give directions to the user of MS A verbally during the telephone call being conducted via MS A and MS B with reference to the created map and indication of the location of MS A thereon.

In embodiments of the invention, steps 15*i* to 15*k* can be repeated, allowing display of a dynamically updating map on MS B that depicts changes in the physical location of MS A as they occur.

In alternative embodiments of the invention, MS B has no map creation application for creating maps for display on MS B, but does have the capability to display images, such information being indicated in the location capability response message of step 15*g*. In such embodiments, the MS A itself plots a map containing a physical representation of its physical location and creates an map image (for example a screenshot from the map creation application) depicting this information for transmittal to MS B via server 100 in steps 15*j* and 15*k*; these steps would therefore involve transmittal of media (image) data. Upon receipt of the image data, MS B is able to display the image of the map created and provided by MS A, thus allowing the user of MS B to view a representation of the physical location of MS A even though MS B has no map creation capability itself.

In further alternative embodiments of the invention where MS B has no map creation application for creating maps for display on MS B, but does have the capability to display images, a network link, such as a URL, for an online mapping service such as Google Maps™ is transmitted to MS B. The network link contains information relating to the physical location of MS A and can be created by MS A and transmitted to server 100 for transmittal on to MS B, or can be derived from the geographical location data received from MS A by server 100 and transmitted on to MS B. When MS B receives the network link, it accesses the mapping service using the received network link. The mapping service uses the information in the network link relating to the physical location of MS A to generate a map image including a representation of the physical location of MS A and transmits the map image to MS B. Once MS B has downloaded the map image, it displays the map image to the user of MS B, thus allowing the user of MS B to view a representation of the physical location of MS A even though MS B has no map creation capability itself.

In embodiments of the invention, the geographical location data is received by server 100 in the form of a data object including geographical coordinate data. A capability check can then be carried out by server 100 in relation to whether the respective user device is capable of processing the geographical coordinate data during the separate communications session. If the capability check indicates that the respective user device is capable of processing the geographical coordinate data, server 100 will transmit the geographical coordinate data during the separate communications session.

Establishing the separate communication session may comprise receiving a client-server connection request from, and establishing a client-server connection with the appropriate user device, and transmitting the data including or derived from the received geographical location data via the client-server connection.

Embodiments of the invention described below in relation to FIGS. 16 to 19 involve enabling the receipt of pre-configured user data by user devices during telephone calls conducted between the user devices. The pre-configured user data is specified by a user of a user device prior to establishment of a telephone call as data for receipt by other user devices during telephone calls conducted by the user.

The separate communication session is used to receive user data other than the call party details (such as the telephone dialling numbers) of a call without the participants to the call having to explicitly transmit the user data themselves. In embodiments of the invention, enabling of the receipt of the pre-configured user data occurs during a call between user devices and is triggered by establishment of a separate communications between the user devices.

The pre-configured user data is specified by a user of a user device as data for receipt by other user devices during telephone calls between the user and other users, e.g. the user can choose certain user data prior to making a telephone call which will be received by the other user device of the other party (or parties in the case of a teleconference) to the telephone call via the separate communication session. The pre-configured user data may comprise data other than the first and second identities received in the call party details of a call.

A user may specify their user data for receipt by other user devices during telephone calls via their telephony user device, for example using personal information manager, PIM, application software on their telephony user device. A user may configure their pre-configured user data by linking to a record in the PIM. A user may also specify their pre-configured user data for transmittal during telephone calls directly to server 100, for example via a web interface.

Figure 16A:
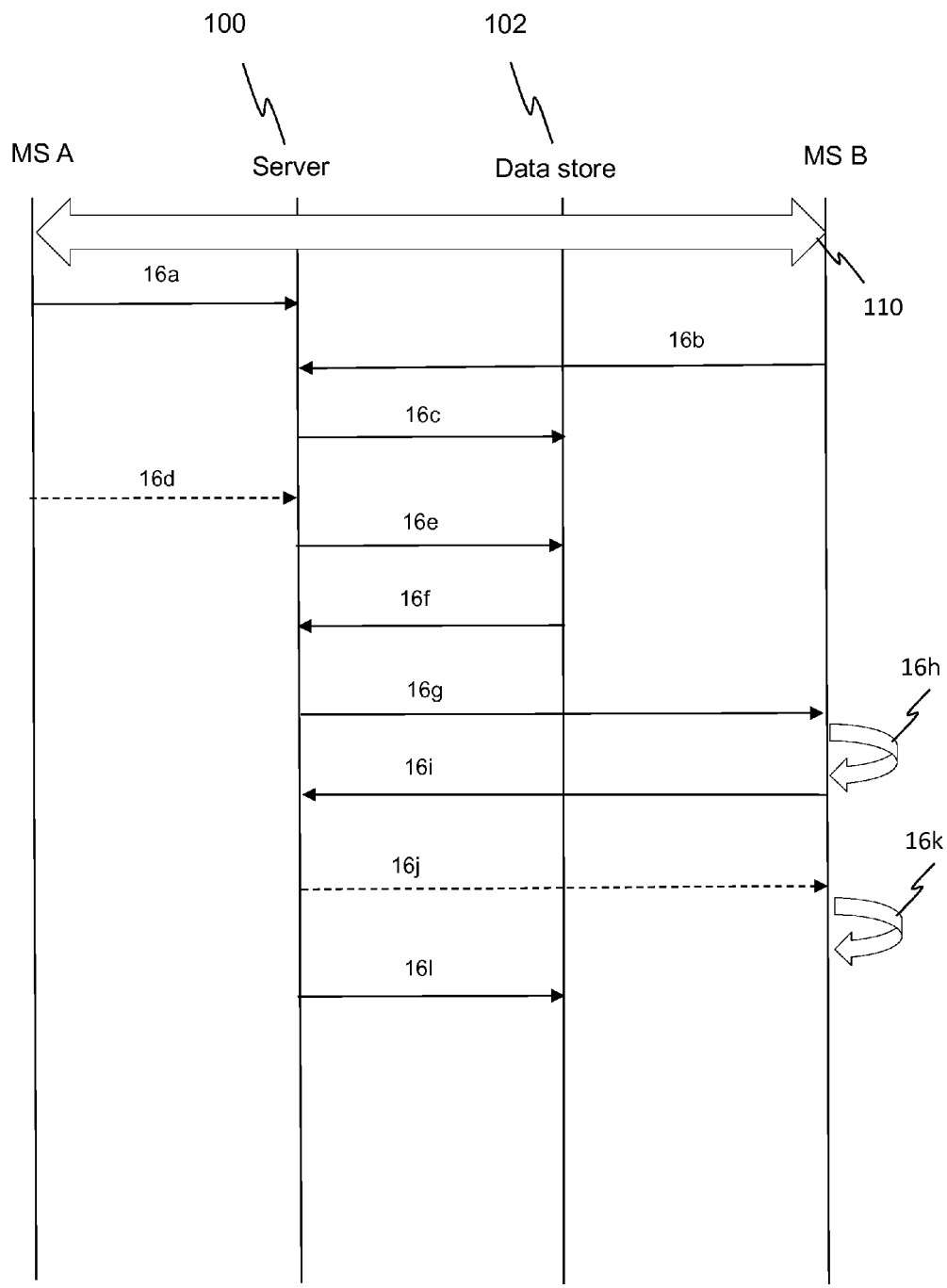
FIGS. 16A and 16B show a flow diagram depicting operation of embodiments of the invention using the system of FIG. 1.
Figure 16B:
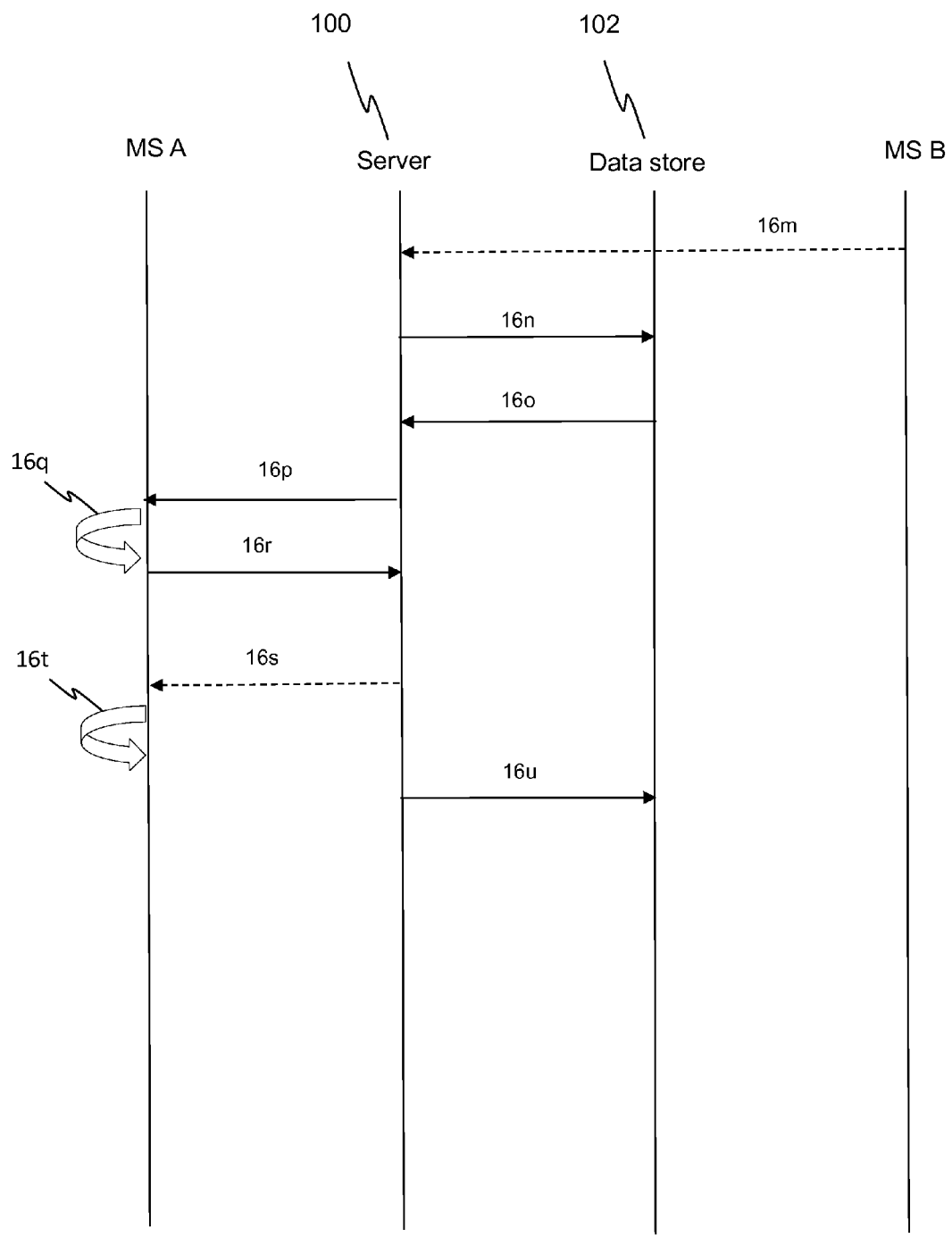

FIGS. 16A and 16B show a flow diagram depicting operation of embodiments of the invention using the system of FIG. 1.

In these embodiments of the invention, the user of MS A has specified, prior to establishment of telephone calls conducted by the user, pre-configured user data for receipt by other user devices during telephone calls conducted using MS A; the user's pre-configured user data is stored on memory associated with MS A.

Similarly, the user of MS B has specified, prior to establishment of telephone calls conducted by the user, pre-configured user data for receipt by other user devices during telephone calls conducted using MS B; the user's pre-configured user data is stored on memory associated with MS B.

These embodiments of the invention involve enabling the receipt of pre-configured user data configured by the user of MS A by MS B via a separate communications session and also involve enabling the receipt of pre-configured user data configured by the user of MS B by MS A via a separate communications session during a call conducted using MS A and MS B.

Similarly to FIG. 2 described above, a voice call is currently in progress between MS A in PLMN A and MS B in PLMN B, as shown by item 110. Application software running on MS A detects the call in progress between MS A and MS B and notifies server 100 of call party details for the call, e.g. the TDNs of telephones involved in the call, TDN A associated with MS A and TDN B associated with MS B, in step 16a. Similarly, application software running on MS B detects the call in progress between MS B and MS A and notifies server 100 of call party details for the call, e.g. the TDNs of telephones involved in the call, TDN B associated with MS B and TDN A associated with MS A, in step 16b.

Server 100 identifies that the notification of step 16a from MS A and the notification of step 16b from MS B have call party details, TDN A and TDN B, in common and establishes a communications session, separate from the telephone call between MS A and MS B, for the communication of data between MS A and MS B. The separate communications session is established on the basis of the received call party details, e.g. TDN A and TDN B. Once the separate communications session is established, voice call data is transmitted via the telephone call and other data can be transmitted and received via the separate communications session.

Some embodiments comprise receiving client-server connection request from, and establishing a client-server connection with, one or both of MS A and MS B.

Server 100 updates the records for MS A and MS B in data store 102 in step 16c to indicate that a call is in progress between MS A and MS B and that a separate communications session between MS A and MS B has been established.

Once the separate communications session between MS A and MS B has been established, MS A retrieves pre-configured user data from its memory and transmits this to server 100 in step 16d. Server 100 performs a lookup in data store 102 using TDN A for MS A in step 16e and identifies that a communications session has been established between MS A and MS B.

Server 100 retrieves TDN B for MS B in step 16f and conducts a check to determine whether MS B already has pre-configured user data for the user of MS A stored locally. Conducting the check involves server 100 transmitting a query to MS B in step 16g. Upon receiving the query of 16g, MS B checks its memory to see whether it has pre-configured user data for the user of MS A stored locally in step 16h and transmits a response to server 100 in step 16i. In this case, the response of step 16i indicates that at least a part of the pre-configured user data for the user of MS A is not stored locally to MS B, so server 100 transmits pre-configured user data for MS A to MS B in step 16j.

In step 16k, MS B updates its local memory according to the pre-configured user data received in step 16j. Server 100 updates data store 102 in step 16l to indicate which pre-configured user data was received by MS B via the separate communications session in step 16j.

MS B retrieves pre-configured user data from its memory and transmits this to server 100 in step 16m. Server 100 performs a lookup in data store 102 using TDN B for MS B in step 16n, identifies that a communications session has been established between MS A and MS B and retrieves TDN A for MS A in step 16o.

A check is conducted to determine whether MS A already has pre-configured user data for the user of MS B stored locally. Conducting the check involves server 100 transmitting a query to MS A in step 16p. Upon receiving the query of 16p, MS A checks its memory to see whether it has pre-configured user data for the user of MS B stored locally in step 16q and transmits a response to server 100 in step 16r. In this case, the response of step 16r indicates that at least a part of the pre-configured user data for the user of MS B is not stored locally to MS A, so server 100 transmits the pre-configured user data for MS B to MS A in step 16s.

In step 16t, MS A updates its local memory according to the pre-configured user data received in step 16s. Server 100 updates data store 102 in step 16u to indicate which pre-configured user data was received by MS A via the separate communications session in step 16s.

In alternative embodiments of the invention, server 100 stores pre-configured user data for a plurality of user devices in data store 102. Data store 102 will include data indicating which user devices have received pre-configured user data in relation to which other user devices, and also which data fields and which versions of pre-configured user data have been transmitted from and received by which user devices. In such embodiments of the invention, checks can be carried out at server 100 with reference to data store 102, without the need to query MS B in step 16g or MS A in step 16p.

In the description of the embodiments of 16A and 16B above, enabling of the receipt of pre-configured user data by MS B is carried out if the check indicates that MS B does not have at least a part of the pre-configured user data for the user of MS A stored locally. In other embodiments of the invention, the configured user data comprises a plurality of data fields and the check involves determining whether current versions of the data fields in data stored locally to MS B require updating to more recent versions. In such embodiments, server 100 will include indications of the values and/or versions of data fields of the pre-configured user data received in step 16d in the query of step 16g.

MS B compares the received data field values and/or versions received in step 16g with data field values and/or versions stored locally to MS B in step 16h. The response of step 16i includes an indication as to which data fields for MS A user data are missing and which require updating. Server 100 transmits the appropriate data field values and/or versions of pre-configured user data for MS A in step 16j. Such embodiments can help avoid receipt of the entire pre-configured user data received in step 16d to MS B in step 16j, e.g. only pre-configured user data required to update MS B can be received and not pre-configured user data which MS B already has. This could for example be particularly useful if the pre-configured user data includes a file having a relatively large file size (such as an image) where repeated transmission/reception of such could have an impact on limited bandwidth resources to/from MS B in PLMN B.

Figure 17:
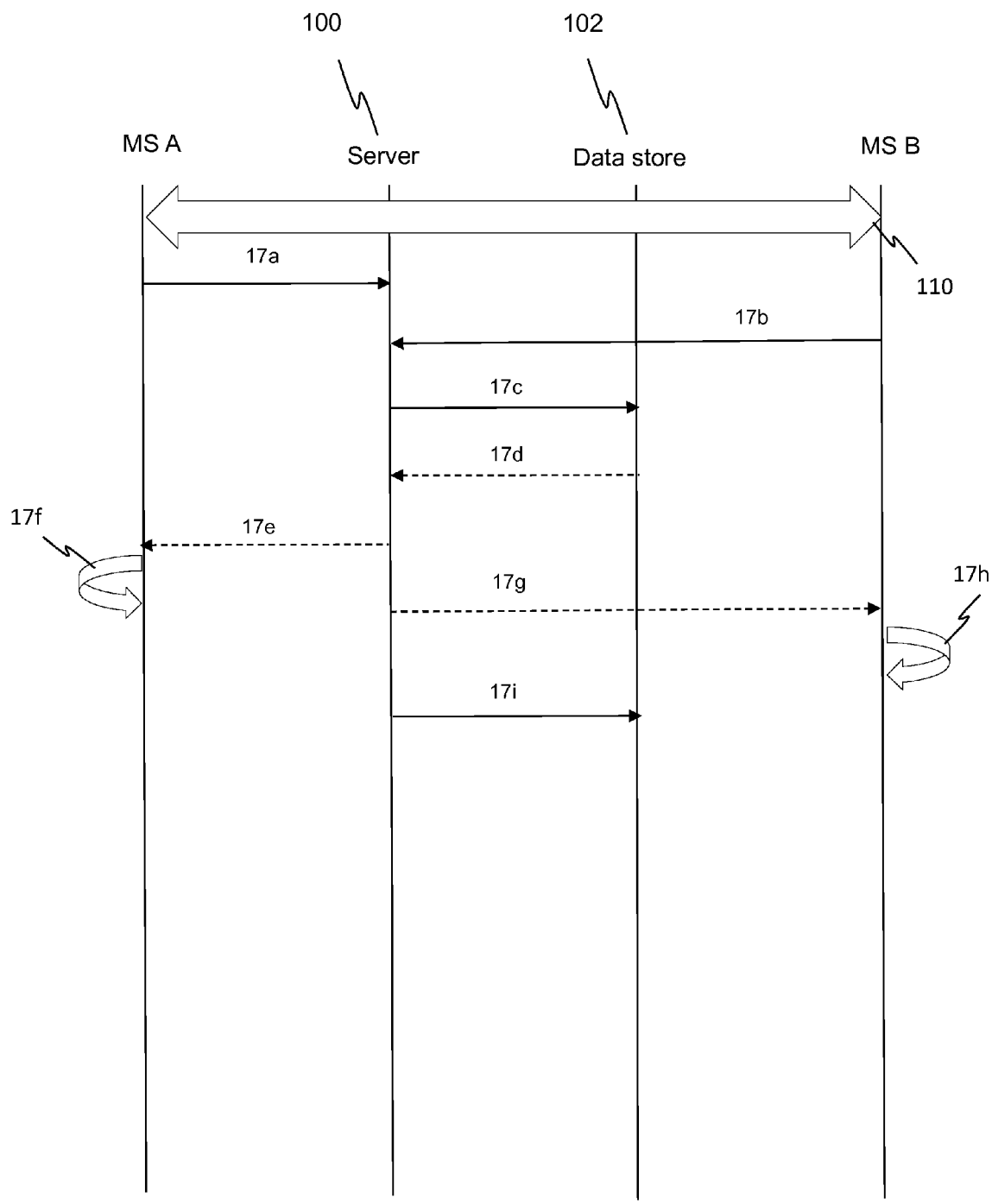
FIG. 17 is a flow diagram depicting operation of embodiments of the invention using the system of FIG. 1.

FIG. 17 is a flow diagram depicting operation of embodiments of the invention using the system of FIG. 1.

In these embodiments of the invention, the user of MS A has specified, prior to establishment of telephone calls conducted by the user, pre-configured user data for receipt by other user devices during subsequent telephone calls conducted using MS A. The user's pre-configured user data has previously been stored in data store 102 associated with server 100, for example transmitted to server 100 from MS A or entered directly to server 100 via a web interface.

Similarly, the user of MS B has specified, prior to establishment of telephone calls conducted by the user, pre-configured user data for receipt by other user devices during subsequent telephone calls conducted using MS B. The user's pre-configured user data has previously been stored in data store 102 associated with server 100, for example transmitted to server 100 from MS B or entered directly to server 100 via a web interface.

Pre-configured user data in data store 102 may be updated via a synchronisation process between MS A and server 100. Synchronisation may involve periodic update requests being sent from server 100 to MS A, with MS A responding with any updates to the pre-configured user data. Alternatively, MS A may send a pre-configured user data update to server 100 whenever the user of MS A makes an update to pre-configured user data within the memory of MS A.

A similar synchronisation process may be carried out for MS B.

These embodiments of the invention involve enabling the receipt of pre-configured user data configured by the user of MS A by MS B via a separate communications session and also enabling the receipt of pre-configured user data configured by the user of MS B by MS A via a separate communications session during a call conducted between MS A and MS B.

Similarly to FIG. 16A described above, a voice call is being conducted between MS A and MS B and steps 17a and 17b occur similarly to steps 16a and 16b as described above.

Server 100 identifies that the notification of step 17a from MS A and the notification of step 17b from MS B have call party details, TDN A and TDN B, in common and establishes a communications session, separate from the telephone call between MS A and MS B, for the communication of data between MS A and MS B. The separate communications session is established on the basis of the received call party details, e.g. TDN A and TDN B. Once the separate communications session is established, voice call data is transmitted via the telephone call and other data can be transmitted and received via the separate communications session.

Once the separate communications session between MS A and MS B has been established, server 100 accesses data store 102 to update the records for MS A and MS B in step 17c to indicate that a call is in progress between MS A and MS B and that a separate communications session between MS A and MS B has been established.

Step 17c also involves server 100 performing a lookup in data store 102 to retrieve pre-configured user data specified for reception by other user devices, including MS B, in relation to MS A and pre-configured user data specified for reception by other user devices, including MS A, in relation to MS B in step 17d.

When server 100 receives pre-configured user data specified for transmittal in relation to MS B in step 17d, it transmits the pre-configured user data to MS A in step 17e. In step 17f, MS A updates its local memory according to the pre-configured user data received in step 17e.

When server 100 receives pre-configured user data specified for receipt by other user devices in relation to MS A in step 17d, it transmits the pre-configured user data to MS B in step 17g. In step 17h, MS B updates its local memory according to the pre-configured user data received in step 17g.

Server 100 updates data store 102 in step 17i to indicate which pre-configured user data was received by MS A in step 17e and which pre-configured user data was received by MS B in step 17g.

The embodiments of FIG. 17 may include conducting checks for MS A and MS B respectively, either at server 100 or by querying MS A and MS B, in a similar manner as described above for FIG. 16.

Figure 18:
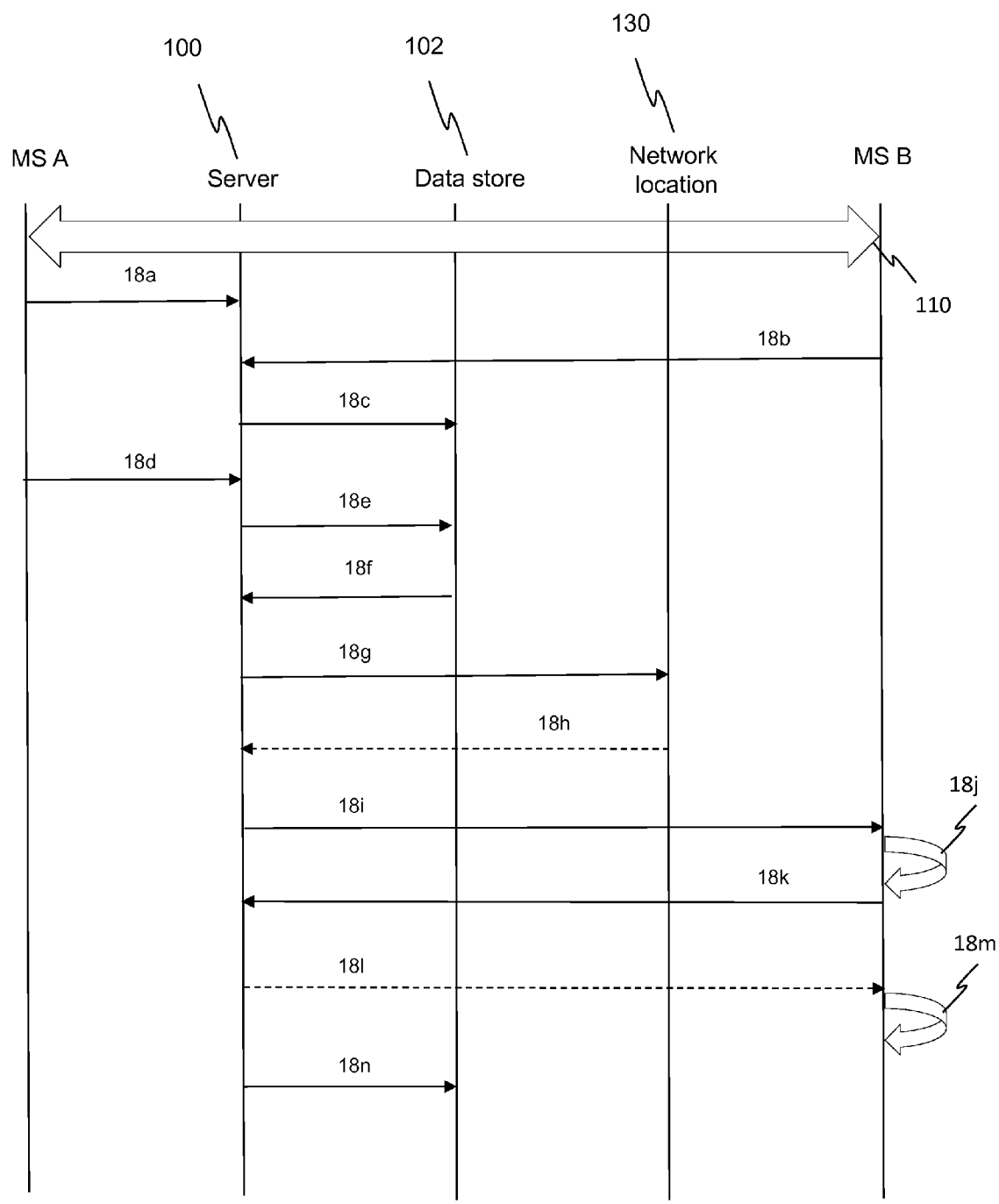
FIG. 18 is a flow diagram depicting operation of embodiments of the invention using the system of FIG. 1.

FIG. 18 is a flow diagram depicting operation of embodiments of the invention using the system of FIG. 1.

In these embodiments of the invention, the user of MS A has specified, prior to establishment of telephone calls conducted by the user, pre-configured user data for reception by other user devices during subsequent telephone calls conducted using MS A. The user's pre-configured user data has previously been stored at network location 130, for example in a database accessible via a web server. The user's pre-configured user data may have been transmitted to network location 130 from MS A or entered directly to network location 130 via a web interface using a personal computer or similar computing device.

These embodiments of the invention involve enabling the receipt of pre-configured user data configured by the user of MS A by MS B via a separate communications session during a call conducted using MS A and MS B.

Similarly to FIG. 16A described above, a voice call is being conducted between MS A and MS B and steps 18a and 18b occur similarly to steps 16a and 16b as described above.

Once the separate communications session between MS A and MS B has been established, MS A retrieves an identifier from its memory which identifies pre-configured user data for reception by other user devices during telephone calls conducted by the user of MS A. The pre-configured user data identifier is transmitted to server 100 in step 18d.

Server 100 performs a lookup in data store 102 using TDN A for MS A in step 18e, identifies that a communications session has been established between MS A and MS B, and retrieves TDN B for MS B in step 18f.

In step 18g, server 100 locates and accesses pre-configured user data for the user of MS A at network location 130 on the basis of the identifier received from MS A in step 18d. The pre-configured user data is transmitted from network location 130 to server 100 in step 18h.

Server 100 uses the retrieved TDN B for MS B to conduct a check to determine whether MS B already has pre-configured user data for the user of MS A stored locally. Conducting the check involves server 100 transmitting a query to MS B in step 18i. Upon receiving the query of 18i, MS B checks its memory to see whether it has pre-configured user data for the user of MS A stored locally in step 18j and transmits a response to server 100 in step 18k. In this case, the response of step 18k indicates that at least a part of the pre-configured user data for the user of MS A is not stored in memory in MS B, so server 100 transmits pre-configured user data for MS A to MS B in step 18l.

In step 18m, MS B updates its local memory according to the pre-configured user data received in step 18l. Server 100 updates data store 102 in step 18n to indicate which pre-configured user data was transmitted to and received by MS B in step 18l.

The identifier could be a network address from which the pre-configured user data can be downloaded, for example a Uniform Resource Locator (URL). As an example, the pre-configured user data identifier could be a URL for an online user account such as a social network account, e.g. a user identity associated with a Facebook™ profile; the pre-configured user data could correspond to a public profile of a user's online account. A user can pre-configure within their profile which user data is to be received by other user devices during telephone calls and the URL identifier can be set to point to such. Server 100 can use the URL identifier to contact the appropriate network address in step 18g and download the appropriate pre-configured user data in step 18h.

In the embodiments of the invention described above in relation to FIG. 18, the identifier transmitted to server 100 in step 18d is used by server 100 in step 18g to retrieve pre-configured user data from network location 130 in step 18h. In alternative embodiments of the invention, the identifier could comprise an identifier for use in retrieving the pre-configured user data from data store 102; in such embodiments, the user of MS A will have previously stored pre-configured user data in data store 102 either transmitted from MS A or entered directly via a web interface using a personal computer or similar computing device.

In alternative embodiments of the invention, the notification of step 18a and the identifier transmittal of step 18d are combined into a single step. Similarly, the data store updating of step 18c and data store lookup of step 18e could be combined into a single step.

Figure 19:
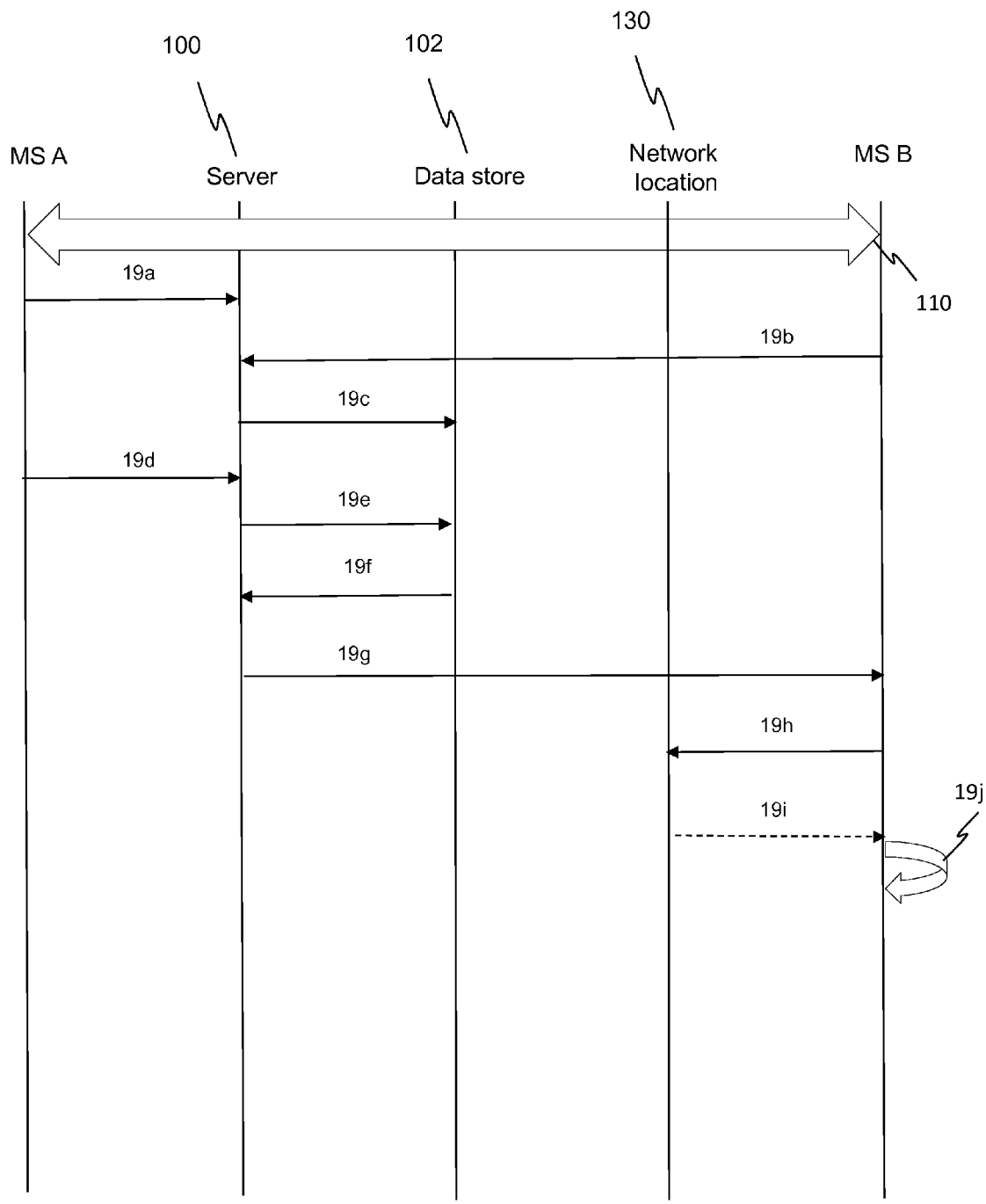
FIG. 19 is a flow diagram depicting operation of embodiments of the invention using the system of FIG. 1.

FIG. 19 is a flow diagram depicting operation of embodiments of the invention using the system of FIG. 1.

In these embodiments of the invention, the user of MS A has specified, prior to establishment of telephone calls conducted by the user, pre-configured user data for reception by other user devices during subsequent telephone calls conducted using MS A. The user's pre-configured user data has previously been stored at network location 130 identified by a pre-configured user data identifier, for example a network address in packet network 106.

These embodiments of the invention involve enabling the reception of pre-configured user data configured by the user of MS A by MS B via a separate communications session during a call conducted using MS A and MS B.

Similarly to FIG. 16A described above, a voice call is being conducted between MS A and MS B and steps 19a to 19c occur similarly to steps 16a to 16c as described above.

Once the separate communications session between MS A and MS B has been established, MS A retrieves an identifier from its memory which identifies pre-configured user data for reception by other user devices during telephone calls conducted by the user of MS A. The pre-configured user data identifier is transmitted to server 100 in step 19d.

Server 100 performs a lookup in data store 102 using TDN A for MS A in step 19e, identifies that a communications session has been established between MS A and MS B, and retrieves TDN B for MS B in step 19f.

Server 100 transmits the pre-configured user data identifier received in step 19d to MS B in step 19g. MS B locates and accesses pre-configured user data for the user of MS A at network location 130 on the basis of the identifier received from MS A in step 19h. The pre-configured user data is transmitted from network location 130 to server 100 in step 19i. In step 19j, MS B updates its local memory according to the pre-configured user data received in step 19i.

In other embodiments of the invention, the pre-configured user data identifier is stored in data store 102 and can be retrieved from data store 102 by server 100, for example in combination with steps 19e and 19f, without requiring transmittal of the pre-configured user data identifier from MS A to server 100 in step 19d.

Download of the pre-configured user data by MS B may include conducting a check in a similar manner as described above for FIG. 16.

In alternative embodiments of the invention, the notification of step 19a and the identifier transmittal of step 19d are combined into a single step. Similarly, the data store updating of step 19c and data store lookup of step 19e could be combined into a single step.

Embodiments of the invention involve server 100 instructing a user device to display one or more parts of pre-configured user data received during a call. Instructing a user device to display pre-configured user data could be combined with transmittal of the pre-configured user data or an identifier for the pre-configured user data to a user device, or could involve a distinct instruction step. Such functionality could be particularly useful if for example the pre-configured user data includes a name for a user associated with the pre-configured user data; displaying the name or user identity associated with a user of one user device on another user device involved in a call provides a convenient way to identity a user involved in a telephone call.

The pre-configured user data could comprise a variety of different types of user data such as one or more of a user's name, a social network user identity, an email address, a date, an image file, and a postal or street address.

Transmittal of pre-configured user data in the form of a name or user identity could be useful in identifying a user conducting a call to one or more other parties to the call. If the image is a photo of a calling party, then a similar effect can be achieved.

Transmittal of pre-configured user data in the form of a postal or street address or email address could be useful in identifying how to contact a user by a different communication means after the telephone call is terminated.

Transmittal of pre-configured user data in the form of a date could be useful in highlighting a date of interest to users such as the date of a user's birthday or other such event date.

Embodiments of the invention described above involve enabling receipt of pre-configured user data associated with the user of a user device to one or more other devices during a call between the user devices. In other embodiments, a user specifies different pre-configured user data for receipt by one or more pre-defined user devices during calls with those user devices. When a user configures their user data, they can pre-define one or more subsets of their pre-configured user data for receipt during calls with one or more pre-defined user devices of their choosing.

Configuration could for example involve associating one or more user devices into different groups such as a family group, a work group etc. Different pre-defined user data can then be received during a call with a user device in the family group than pre-defined user data received during a call with a user device in the work group.

Embodiments of the invention involve identifying that a call is being conducted with a pre-defined user device on the basis of received call party details for the call, for example a telephone dialling number associated with a user device pre-defined by a user. When a call with such a pre-defined user device is identified, the subset of pre-configured user data can be received the pre-defined user device instead of or in addition to the pre-defined user data received by other non-pre-defined user devices.

Embodiments of the invention involve a telephony user device capable of establishing a communications session for communication of data with respect to at least one other user device in a data communications network, the telephony user device comprising a data store and being capable of:

transmitting call party details of a telephone call, the telephone call involving at least the telephony user device, the telephony user device being a first telephony user device, and a second telephony user device, the call party details including a first identity associated with the first telephony user device and a second identity associated with the second telephony user device, at least one of the first and second identities comprising a telephone dialling number;

establishing, on the basis of the first and second identities received in the call party details, a separate communications session, separate from the telephone call, for the communication of data to and/or from the at least one other user device;

receiving data from the at least one other user device via the separate communications session; and presenting the user of the telephony user device with an option to update the data store with at least a part of the received data.

In such embodiments, the received data need not be user data and need not have been have been specified by a user of a user device prior to the establishment of the telephone call as data for receipt by other user devices during telephone calls conducted by the user.

In such embodiments of the invention, upon receipt of data at a user device, the user device may carry out a search of a local data store or internal memory to see if data corresponding to the received data or part thereof is already stored with the data store. If the search of a user device's data store does not find data corresponding to at least a part of the received data in its store, then the data store can be updated with one or more parts of the received data accordingly.

When the data is received at a user device, one or more parts of the received data may be displayed by the user device during the call, for example the name of the other party to the call could be displayed during the call. The display may occur in response to receipt of a display instruction from server 100 and may include giving the user the option to allow display of the data or not.

Displaying the received data may involve overlaying the display of the received data over other data displayed during the call. The received data may for example be overlaid over other data already displayed in association with an in-call screen application (or call dialling application) running on the user device and operable via a touch-screen interface; such an application will typically involve display of a number of touch-sensitive icons for inputting telephone dialling number digits and facilitating operations such as 'dial number', 'end call', 'hold call' etc. The other data may also include a telephone number or other identifier associated with a calling or called party for the call. Overlaying the received data may involve displaying the received data in a translucent manner such that other data displayed during the call can also be seen through the displayed received data. Alternatively, overlaying the received data may involve displaying the received data in a non-translucent manner to replace data already displayed during the call, for example the display of the telephone dialling number of the other party to the call could be replaced by the name of the other party to the call.

When the data is received at a user device, the user device may present the user with an option to update the user device data store with the received data, for example by appropriate output on a display of the user device. The user can authorise updating of the data store by user input via a telephony device user input interface.

The option to update the data store of a user device with received data may be presented when the users are still conducting a telephone call. Alternatively, or in addition, the update option is presented to a user after termination of the call.

Termination of the call may be detected by application software on the telephony user device which is capable of detecting termination of calls made by the telephony user device.

Alternatively, the telephony user device may receive notification of termination of the call from the data communications network, for example from a network entity such as server 100, network element 108 or SCP 150.

The telephony user device may temporarily update its data store with all or a part of the data received via the separate communication session for the duration of the call. The user can then be presented with the option to confirm the temporary (in-call) updating of the data store after termination of the call.

In alternative embodiments of the invention, the data store of the telephony user device is updated in response to receipt of data via the separate communications session without the user being presented with the option to accept the update(s) or not.

Embodiments of the invention allow the user of the telephony user device to choose if and to what extent the data store of their telephony user device is updated with data received via the separate communication session. Such embodiments may for example involve allowing the user to configure settings such that any updates for data received from a particular contact in the telephony user device address book are rejected, or data received from a particular contact are only used to update the data store a single time, or data received from contacts contained in the telephony user device address book are used to update the date store without requiring confirmation from the user. Another embodiment might involve allowing a user to create a black-list of a number of contacts from which received data are not to be used to update the data store.

Various measures (for example a method, server apparatus, telecommunications network, computer software and a computer program product comprising a non-transitory computer-readable storage medium) for establishing a communications session for communication of data with respect to at least two user devices in a data communications network are provided. Call party details of a telephone call are received. The telephone call involves at least a first telephony user device and a second telephony user device. The call party details include a first identity associated with the first telephony user device and a second identity associated with the second telephony user device. A client-server connection request is received from, and a client-server connection is established with, at least one of the at least two user devices. A separate communications session is established, on the basis of the first and second identities received in the call party details, for the communication of data to and/or from the at least two user devices. The separate communications session is separate from the telephone call. The receipt of pre-configured user data is enabled by the at least one of the at least two user devices via the client-server connection. The pre-configured user data is specified by a user of one other of the at least two user devices prior to the establishment of the telephone call as data for receipt by other user devices during telephone calls conducted by the user.

In some embodiments, at least one of the first and second identities comprises a telephone dialling number.

In some embodiments, the enabling is carried out in response to establishment of the separate communications session.

In some embodiments, the pre-configured user data is received and the received pre-configured user data is transmitted to at least one of the at least two user devices.

In some embodiments, the pre-configured user data is received prior to the call and stored in a data store. In response to establishment of the separate communications session the pre-configured user data is retrieved from the store and the pre-configured user data is transmitted for receipt.

In some embodiments, the pre-configured user data is received from the one other of the at least two user devices after establishment of the separate communications session.

In some embodiments, the pre-configured user data is configured by linking to a record in a personal information manager (PIM) on the one other of the at least two user devices.

In some embodiments, an identifier identifying the pre-configured user data is received from the one other of the at least two user devices; the pre-configured user data is retrieved on the basis of the received identifier; and the retrieved pre-configured user data is transmitted to at least one of the at least two user devices.

In some embodiments, an identifier identifying the pre-configured user data is received from the one other of the at least two user devices; and the received identifier is transmitted to at least one of the at least two user devices.

In some embodiments, the identifier comprises a network address from which the pre-configured user data can be downloaded.

In some embodiments, the at least one of the at least two user devices is instructed to display one or more parts of the pre-configured user data during the call.

In some embodiments, the pre-configured user data comprises data other than the first and second identities.

In some embodiments, a check is conducted to determine whether the at least one of the at least two user devices already has pre-configured user data for the user stored locally, wherein the enabling is carried out if the check indicates that the at least one of the at least two user devices does not have at least a part of the pre-configured user data for the user stored locally.

In some embodiments, the conducting a check comprises transmitting a query to the at least one of the at least two user devices, and receiving at least one response indicating whether the at least one of the at least two user devices has pre-configured user data for the user stored locally.

In some embodiments, pre-configured user data for a plurality of user devices is stored in a data store accessible by a server. The check is conducted at the server.

In some embodiments, the pre-configured user data comprises a plurality of data fields and the check comprises determining whether current versions of the data fields in data stored locally to the at least one of the at least two user devices require updating to more recent versions.

In some embodiments, the pre-configured user data comprises one or more of: a user identity, a user's name, a social network user identity, an email address, a date, an image file, and a postal or street address.

In some embodiments, the receipt of a subset of the pre-configured user data by one or more pre-defined user devices via the separate communications session is enabled. The subset of the pre-configured user data is specified by the user of the one other of the at least two user devices as data for receipt by the one or more pre-defined user devices during telephone calls conducted by the user.

In some embodiments the call is identified as being conducted with the one or more pre-defined user devices on the basis of the received call party details, wherein the enabling of receipt of the subset of pre-configured user data is carried out in response to the call identification.

In some embodiments, the pre-configured user data is transmitted via the client-server connection established with the one of the at least two user devices.

In some embodiments, establishing the session comprises receiving a further client-server connection request from, and establishing a client-server connection with, the another of the at least two user devices.

In some embodiments, the client-server connection request and/or the further client-server connection request is transmitted in response to the telephone call being established.

In some embodiments, the client-server connection request and/or the further client-server connection request is transmitted in response to a notification received after the telephone call is established.

Various measures (for example, a telephony user device, computer software and a computer program product comprising a non-transitory computer-readable storage medium) for establishing a communications session for communication of data with respect to at least one other user device in a data communications network are provided. Call party details of a telephone call are transmitted. The telephone call involves at least the telephony user device, the telephony user device being a first telephony user device, and a second telephony user device. The call party details include a first identity associated with the first telephony user device and a second identity associated with the second telephony user device. A client-server connection request is transmitted to, and a client-server connection is established with, a server. A separate communications session is established, on the basis of the first and second identities received in the call party details, for the communication of data to and/or from the at least one other user device. The separate communications session is separate from the telephone call. Pre-configured user data is transmitted to the at least one other user device via the client-server connection. The pre-configured user data is specified by a user of the telephony user device prior to the establishment of the telephone call as data for transmittal to other user devices during telephone calls conducted by the user.

In some embodiments, at least one of the first and second identities comprises a telephone dialling number.

Various measures (for example a telephony user device, computer software and a computer program product comprising a non-transitory computer-readable storage medium) for establishing a communications session for communication of data with respect to at least one other user device in a data communications network is provided. Call party details of a telephone call are transmitted. The telephone call involves at least the telephony user device, the telephony user device being a first telephony user device, and a second telephony user device. The call party details include a first identity associated with the first telephony user device and a second identity associated with the second telephony user device. At least one of the first and second identities comprises a telephone dialling number. A client-server connection request is transmitted to, and a client-server connection is established with, a server. A separate communications session is established, on the basis of the first and second identities received in the call party details, for the communication of data to and/or from the at least one other user device. The separate communications session is separate from the telephone call. Data is received from the at least one other user device via the client-server connection. The user of the telephony user device is presented with an option to update the data store with at least a part of the received data.

In some embodiments, presenting the option occurs after termination of the call.

In some embodiments, the processor is further configured to detect termination of the call.

In some embodiments, the processor is further configured to receive notification of termination of the call from the data communications network.

In some embodiments, the processor is further configured to, upon receipt of the data, search the data store for data corresponding to the received data, wherein presenting the option occurs in response to not finding at least a part of the received data in the store.

In some embodiments, the processor is further configured to update the data store with the at least part of the received data in response to user input on the telephony user device.

In some embodiments, the processor is further configured to display one or more parts of the received data during the call.

In some embodiments, the processor is further configured to overlay the display of the one or more parts of the received data over other data displayed during the call.

In some embodiments, the other data comprises data associated with an in-call screen application.

In some embodiments, the processor is further configured to temporarily update the data store with the at least part of the received data for the duration of the call.

In some embodiments, the processor is further configured to present the user of the telephony user device with an option to confirm the temporary updating of the data store after termination of the call.

In some embodiments, the received data comprises pre-configured user data specified by the user of the at least one other user device as data for receipt by other user devices during telephone calls conducted by the user of the least one other user device.

The above embodiments are to be understood as illustrative examples of the invention. Further embodiments of the invention are envisaged.

The above described embodiments primarily relate to telephony devices having associated identities in the form of telephone dialling numbers. In other embodiments of the invention, one or more, or all of the identities could be non-telephone-dialling-numbers, for example usernames, email addresses etc. Where non-telephone-dialling-number identities are employed, mappings between non-telephone-dialling-number identities and telephone dialling number identities may be stored in data store 102 and used by server 100 for converting from non-telephone-dialling-number identities to telephone dialling numbers after receipt of the call party details The personal computer PC A described above could alternatively be another device or combination of devices with corresponding data processing, display and data input capabilities, for example a television, a smart television, a general purpose desktop computer terminal, a general purpose laptop computer terminal, a general purpose tablet computer terminal, an in-car computing and communications system a satellite navigation system, games console, or any combination thereof.

In embodiments of the invention described above, telephone calls to/from mobile stations and POTS phones are detected either by application software running on the mobile stations or by a telephony apparatus configured accordingly. In alternative embodiments of the invention, during a voice call, a party to the call uses a computing terminal to enter in call party details (for example the calling and called party telephone dialling numbers) for the call via a web server interface. The web server interface passes the call party details to server 100 which can then establish a communications session, separate to the voice call, on the basis of the calling and called party telephone dialling numbers received from the web server interface.

The logical coupling between user devices for a user may be temporary or more permanent. If for example a user has a POTS phone and a PC as their user devices in their home, then these devices will tend to be used by the user on a fairly permanent basis, so the logical coupling would tend to be more permanent. If for example a user has a mobile phone and a satellite navigation system in their car, then the logical coupling between the two devices may only be valid when the user is in or near their car, so the logical coupling would only be maintained temporarily when the two devices are within close enough proximity of each other.

The logical coupling between a user's devices can be activated (or otherwise triggered) by a variety of different processes. One example could involve communication between a smartphone and a satellite navigation system via a short wave radio interface (such as a Bluetooth™ interface) in order to couple the two devices together locally, along with subsequent registration of details of such with server 100. Another example could be registration of device details via a website. A further example might involve registration by a service engineer when installing a telephone and set-top box combination. Alternatively, registration could be carried out over the telephone verbally to an administrative operator, or via an Interactive Voice Response (IVR) system.

The above embodiments of the invention describe telephone calls and establishment of communications sessions for user devices of two parties. All embodiments of the invention can be applied to user devices of multiple parties numbering more than two. When the multiple parties are conducting a multi-leg teleconference, a communications session can be created between all of their user devices, allowing communication of data, not just between two user devices, but between many different combinations of user devices, i.e. multi-branch data communication.

The connections between server 100 and the user devices are described above as being HTTP or HTTPS connections. In alternative embodiments of the invention, the connections could be peer-to-peer connections such that data is communicated between the user devices through a number of peer-to-peer nodes. Creating the peer-to-peer connections may involve use of processes for traversing firewalls, for example using protocols such as the Simple Traversal of User Datagram Protocol (UDP) Through Network Address Translators (NATs) (STUN) protocol.

Further alternatively, the connections could initially be created as HTTP or HTTPS connections between server 100 and the user devices, but then could be migrated to peer-to-peer connections according to network topography and/or current network load.

Embodiments of the invention described above involve communication of different types of data during a communication session, for example software component identifiers, software applications, feature identifiers, authorisation requests, authorisation indications, geographical location data, etc. Any of these different types of data may be communicated between the various combinations of devices in the above described embodiments, including mobile station to mobile station and mobile station to PC, both with or without use of telephony apparatus for call detection.

In the above-described embodiments, both call parties transmit, either from the telephony device, or an associated device, call party identifiers for each party to the server 100 in the process of setting up the separate data communications session. These call party identifiers are, in the embodiments described, both telephony dialling numbers (TDNs). In alternative embodiments of the invention, one party or both parties may be identified by another form of call party identifier, using for example one or more lookup mechanisms which map a telephony dialling number to a different unique identifier and/or vice-versa (examples of such alternatives are described in further detail below.) However, such lookup mechanisms may increase latency and may introduce unexpected errors (e.g. if a lookup database such as an address book is not kept up to date.) Hence, whilst it is not indeed necessary for either party to transmit a telephony dialling number of either party (since either party may be identified by other mechanisms), it is preferred that at least one of the devices includes the telephony dialling number of the other party.

Indeed, whilst it is again not necessary, it is preferred that both parties transmit the telephony dialling number of the other party, if available, to the server 100, during the session setup. Furthermore, in order at least to reduce latency at the server, and/or to reduce the need to maintain a separate store of identities and/or to reduce the need to implement a registration mechanism, it is preferred that both parties transmit both their own telephony dialling number and the telephony dialling number of the other party, if available, to the server 100, during the session setup. If a call party is identifiable using an additional identifier, such as an extension number or a conference call ID, the additional identifier is preferably transmitted in association with both of the telephony dialling numbers, if available, by one or each party to the call.

As mentioned above, in alternative embodiments of the invention, one, or each, of the call parties may transmit, either from the telephony device, or an associated device, a unique identifier in the form other than that of a telephony dialling number which is nonetheless recognisable by the server 100. A user device which interacts with the server may thus transmit the unique identifier to identify one party, or both parties, as a party to the call, instead of a telephony dialling number. For example, the server 100 may have access to a data store which includes a set of unique identifiers for all subscribers registered to receive the service provided by the server 100, along with a corresponding telephony dialling number for a telephony device associated with each respective unique identifier. Such unique identifiers may be allocated by the server 100 during an initial registration procedure, and notified to, and stored by, an application on the user device which interacts with the server 100 during the registration procedure. Other globally unique identifiers, such as email addresses, Facebook™ IDs, etc. may be used alternatively, or in addition, to such allocated unique identifiers.

In embodiments of the invention, at least one of the two call parties may use a Voice-over-Internet-Protocol (VoIP) enabled device or other device employing the session Initiation Protocol (SIP). One, or each, party may be identified in the call setup procedures by means of a unique SIP user identifier which may include a telephone dialling number as a user identifier or a user identifier other than a telephony dialling number, for example a SIP identifier in the form of username@hostname. Thus, a SIP user identifier can be transmitted to the server 100 as a call party identifier identifying at least one, or each, participant in the call.

In embodiments of the invention, a call party identifier may take the form of an Internet Protocol (IP) address, which may be either a static or dynamically allocated IP address. This may for example be the IP address which a user device transmits to the server 100 in a client-server connection setup request, for example an HTTP setup request, when establishing a leg of the communications session. This may uniquely identify the call party associated with the device making the request. If for example, a given party sends the telephony dialling number of only the other party to the server 100 in the session setup procedure, then that given party can nevertheless be identified as a party to the call using the IP address of that given party's device used in establishing the session leg. The supplied IP address may then be used to send data to that given party's device throughout the ensuing communications session, even if the IP address is only temporarily allocated to the user device as a dynamic IP address. Hence, a static or dynamic IP address may be used, in some embodiments of the invention, to identify a call party and may be one of the call party identifiers which forms part of the call party details transmitted to the server 100, e.g. in a connection setup request during session establishment.

In embodiments of the invention, a call party identifier may take the form of a session identifier, or other unique identifier, generated by the server 100 and received from the server 100 by a user device in a push notification message. Such a push notification message may be sent from the server in response to the server receiving call party details from the other party to the call, in a first communication session leg. The push notification message is configured, on receipt, to trigger the user device to set up a second communication session leg with the server 100. The user device may be configured to include the identifier received in the push notification as a call party identifier in a client-server connection setup request, for example an HTTP setup request, when establishing the communications session leg in response to the push notification message. This may uniquely identify the call party associated with the device making the request, since such identifier may be mapped to the telephony dialling number, or other call party identifier, by the server 100. Hence, an identifier received in a push notification message may be used, in some embodiments of the invention, to identify a call party and may be one of the call party identifiers which forms part of the call party details transmitted to the server 100, e.g. in a connection setup request during session establishment.

A unique identifier in any of the various forms described above, in a form other than that of a telephony dialling number, may be used to identify a given party to the call, in call party details transmitted by a user device associated with that given party. A unique identifier in any of the various forms described, in a form other than that of a telephony dialling number, may in addition, or in the alternative, be used to identify another party to the call, in call party details transmitted by that given party. The server 100 may supply the unique identifiers of other parties, using e.g. a synchronization process for populating an address book locally stored on the user device with such identifiers. Alternatively, such unique identifiers of other parties may already be stored by, or manually added by a user of the device, in the local address book. Further alternatively, the unique identifiers may be stored in a global address book stored on a remote device. At least one of the two parties may have a user device which is configured to look up, from a local data store (e.g. a local address book) or a remote data store (e.g. a global address book), a correspondence between the other party's telephone dialling number, or other received unique identifier, and a different unique identifier. The different unique identifier may then be used instead to identify the other party to the call in the call party details transmitted by at least one side of the call to the server 100.

In the above, various forms of alternative call party identifiers are described. Whatever form the supplied unique identifier takes, the server 100 may have a corresponding database and lookup mechanism to map a supplied unique identifier to a different call party identifier, such as a telephony dialling number, whereby to match both session legs together as relating to a particular current telephone call, using the information supplied in each respective one of the session legs. The server can then bridge the two session legs together, or otherwise associate the two session legs, to create a separate communications session between the participants in a currently ongoing call.

In the above described embodiments, whilst a different form of call party identifier may be used in some cases, in a generally accessible telephony system at least one of the two parties may have no access to identifying details other than the telephony dialling number of the other call party when the call is established. Hence, it is preferable that the system is configured such that at least one of the two parties may transmit the call party identifier of the other party to the server 100 in the form of a telephony dialling number, and that the server 100 is able to process one or more call party details in such a form in order to establish the separate communications session.

In alternative embodiments of the invention, rather than both call parties transmitting both calling party and called party identifiers to identify the parties to a call, at least one of the parties may transmit only one of the two call party identifiers to the server 100. This may be done according to a predetermined convention, e.g. a convention which determines that the calling party should always transmit both identifiers but the called party need only transmit one identifier (or vice-versa). Again, the server 100 is nevertheless able to match both session legs together as relating to a particular current telephone call, using the information supplied in both of the session legs. In this case, it is sufficient that at least one common call participant, namely that participant which is determined by convention to be identified by each party to the call, has been identified in each session leg.

In some circumstances, the telephony dialling number, or other call party identifier, of the other party may not be received at all during the call setup procedures. For example, the other party may use a number withholding service. Hence, an identifier for the other party may not be available to the user device. In this case, the user device may be able, during the setup of the separate communications session, to identify only its associated call party (and not the other call party) to the server 100 as a party to the call. However, providing both sides of the call do not use a number withholding service, the other party's device may be able identify both parties to the call, and preferably transmits call party details identifying both call parties to the server 100 during session establishment. Again, the server 100 is nevertheless able to match both session legs together as relating to a particular current telephone call, using the information supplied in both of the session legs. Again, in this case, it is sufficient that at least one common call participant, namely the participant not using a number withholding service, has been identified in both session legs.

In the above-described embodiments the mobile stations MS A, MS B communicate via a PLMN. Such a PLMN may be any of a variety of different cellular communications network types, including a 2G network such as a Global System for Mobile communications (GSM) network, a 3G network, such as a Universal Mobile Telecommunications System (UMTS) network or a 4G network such as a Long Term Evolution (LTE or LTE Advanced) network. Whilst the call setup and call data flow is preferably conducted via the PLMN, the communications relating to the separate data communications session, e.g. communications with the server 100, may be conducted via a different radio access network (RAN), such as a wireless local area network (WLAN) based on the IEEE 802.11 standards.

In the above-described embodiments, the server 100 is described as a single computing device located in a single network location. However, it should be understood that the server may consist of a distributed set of computing devices or applications, either co-located in a single network location, or dispersed in different network locations.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of establishing a communications session for communication of data with respect to at least two telephony user devices in a data communications network, the method comprising:
receiving, at a server apparatus, call party details of a telephone call, the telephone call involving at least a calling party telephony user device and a called party telephony user device, said call party details including a calling party identity associated with said calling party telephony user device and a called party identity associated with said called party telephony user device;
receiving, at the server apparatus, a client-server connection request from, and establishing a client-server connection with, at least one of said calling party telephony user device and said called party telephony user device;
establishing, by the server apparatus and on the basis of said calling party identity and said called party identity received in said call party details, a separate communications session, separate from said telephone call, for the communication of data to and/or from said calling party telephony user device and said called party telephony user device;
conducting, at the server apparatus, a check to determine whether said at least one of said calling party telephony user device and said called party telephony user device has pre-configured user data for a user of one other of said calling party telephony user device and said called party telephony user device stored locally, said pre-configured user data having been specified by said user prior to the establishment of said telephone call as data for receipt by other user devices during telephone calls conducted by said user; and
enabling, by the server apparatus, the receipt of at least a part of said pre-configured user data by said at least one of said calling party telephony user device and said called party telephony user device via said client-server connection when said check, conducted at the server apparatus, indicates that said at least one of said calling party telephony user device and said called party telephony user device does not have at least part of said pre-configured user data for said user stored locally.

2. The method of claim 1, wherein at least one of said calling party identity and called party identity comprises a telephone dialing number.

3. The method of claim 1, wherein said enabling is carried out in response to establishment of said separate communications session.

4. The method of claim 1, further comprising:
receiving said pre-configured user data; and
transmitting said received pre-configured user data to at least one of said calling party telephony user device and said called party telephony user device.

5. The method of claim 1, further comprising instructing said at least one of said calling party telephony user device and said called party telephony user device to display one or more parts of said pre-configured user data during said call.

6. The method of claim 1, wherein said conducting a check comprises transmitting a query to said at least one of said calling party telephony user device and said called party telephony user device, and receiving at least one response indicating whether said at least one of said calling party telephony user device and said called party telephony user device has pre-configured user data for said user stored locally.

7. The method of claim 1, further comprising storing pre-configured user data for a plurality of user devices in a data store accessible by the server apparatus.

8. The method of claim 1, wherein said pre-configured user data comprises a plurality of data fields and said check comprises determining whether current versions of said data fields in data stored locally to said at least one of said calling party telephony user device and said called party telephony user device require updating to more recent versions.

9. The method of claim 1, further comprising enabling the receipt of a subset of said pre-configured user data by said at least one of said calling party telephony user device and said called party telephony user device via said separate communications session, said subset of said pre-configured user data having been specified by said user as data for receipt by said at least one of said calling party telephony user device and said called party telephony user device during telephone calls conducted by said user.

10. The method of claim 1, comprising transmitting said pre-configured user data via said client-server connection established with said at least one of said called party telephony user device and said party telephony user device.

11. The method of claim 1, wherein establishing said session comprises receiving a further client-server connection request from, and establishing a client-server connection with, said one other of said calling party telephony user device and said called party telephony user device.

12. Server apparatus arranged to establish a communications session for communication of data with respect to at least two telephony user devices in a data communications network, the server apparatus being configured to:
receive call party details of a telephone call, the telephone call involving at least a calling party telephony user device and a called party telephony user device, said call party details including a calling party identity associated with said calling party telephony user device and a called party identity associated with said called party telephony user device;
receive a client-server connection request from, and establish a client-server connection with, at least one of said calling party telephony user device and said called party telephony user device;
establish, on the basis of said calling party identity and said called party identity received in said call party details, a separate communications session, separate from said telephone call, for the communication of data to and/or from said calling party telephony user device and said called party telephony user device;
conduct a check to determine whether said at least one of said calling party telephony user device and said called party telephony user device has pre-configured user data for a user of one other of said calling party telephony user device and said called party telephony user device stored locally, said pre-configured user data having been specified by said user prior to the establishment of said telephone call as data for receipt by other user devices during telephone calls conducted by said user; and
enable, the receipt of at least a part of said pre-configured user data for said user by said at least one of said calling party telephony user device and said called party telephony user device via said client-server connection, when said check, conducted at said server apparatus, indicates that said at least one of said calling party telephony user device and said called party telephony user device does not have at least part of said pre-configured user data for said user stored locally.

13. A telephony user device for establishing a communications session for communication of data with respect to at least one other telephony user device in a data communications network, the telephony user device comprising a processor configured to:
transmit call party details of a telephone call to a server apparatus, the telephone call involving at least said telephony user device, said telephony user device being a first telephony user device, and a second telephony user device, said call party details including a calling party identity and a called party identity;
transmit a client-server connection request to, and establish a client-server connection with, the server apparatus;
establish, on the basis of said calling party and called party identities in said transmitted call party details, a separate communications session, separate from said telephone call, for the communication of data to and/or from said at least one other telephony user device;
establish, on the basis of said calling party and called party identities in said transmitted call party details, a separate communications session, separate from said telephone call, for the communication of data to and/or from the at least one other telephony user device;
receive, from the server apparatus via the client-server connection, a query to check whether pre-configured user data for a user of said at least one other telephony user device is stored locally at the first telephony user device;
transmit pre-configured user data to said at least one other user telephony device via said client-server connection, said pre-configured user data having been specified by a user of said first telephony user device prior to the establishment of said telephone call as data for transmittal to other user devices during telephone calls conducted by said user;
receive, from the server apparatus via the client-server connection, a query to check whether pre-configured user data for a user of said at least one other telephony user device is stored locally at the first telephony user device: and
conduct a check to determine whether said pre-configured user data for said user of said at least one other telephony user device is stored locally.

14. A telephony user device capable of establishing a communications session for communication of data with respect to at least one other telephony user device in a data communications network, the telephony user device comprising a data store and comprising a processor configured to:
transmit call party details of a telephone call to a server apparatus, the telephone call involving at least said telephony user device, said telephony user device being a first telephony user device, and a second telephony user device, said call party details including a calling party identity and a called party identity, at least one of said calling party identity and said called party identity comprising a telephone dialing number;
transmit a client-server connection request to, and establish a client-server connection with, the server apparatus; said transmitted call party details, a separate communications session, separate from said telephone call, for the communication of data to and/or from the at least one other telephony user device;
receive, from the server apparatus via the client-server connection, a query to check whether pre-configured user data for a user of said at least one other telephony user device is stored locally at the first telephony user device;
conduct a check to determine whether the pre-configured user data for said user of said at least one other telephony user device is stored locally at the first telephony user device;
receive at least a part of the preconfigured user data from said at least one other telephony user device via said client-server connection; and present a user of said first telephony user device with an option to update said data store with at least a part of said received preconfigured user data.

15. The telephony user device of claim 14, wherein the processor is further configured to present the option after termination of said call.

16. The telephony user device of claim 15, wherein the processor is further configured to detect termination of said call.

17. The telephony user device of claim 14, wherein the processor is further configured to;
   upon receipt of said data, search said data store for data corresponding to said received data; and
   present the option in response to not finding at least a part of said received data in said store.

18. The telephony user device of claim 14, wherein the processor is further configured to display one or more parts of said received data during said call.

19. The telephony user device of claim 14, wherein the processor is further configured to temporarily update said data store with said at least a part of said received data for the duration of said call.

* * * * *